(12) United States Patent
Sawada et al.

(10) Patent No.: US 12,189,873 B2
(45) Date of Patent: Jan. 7, 2025

(54) INPUT DEVICE AND INPUT SYSTEM

(71) Applicant: Panasonic Intellectual Property Management Co., Ltd., Osaka (JP)

(72) Inventors: Masaki Sawada, Osaka (JP); Hiroaki Nishiono, Osaka (JP); Satoshi Yoshihara, Hyogo (JP); Kota Araki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 208 days.

(21) Appl. No.: 17/617,291

(22) PCT Filed: Feb. 19, 2020

(86) PCT No.: PCT/JP2020/006637
§ 371 (c)(1),
(2) Date: Dec. 7, 2021

(87) PCT Pub. No.: WO2020/246077
PCT Pub. Date: Dec. 10, 2020

(65) Prior Publication Data
US 2022/0253155 A1 Aug. 11, 2022

(30) Foreign Application Priority Data
Jun. 7, 2019 (JP) .................................. 2019-107485

(51) Int. Cl.
*G06F 3/0362* (2013.01)
*G06F 3/039* (2013.01)
(Continued)

(52) U.S. Cl.
CPC .......... *G06F 3/0362* (2013.01); *G06F 3/0393* (2019.05); *G06F 3/04164* (2019.05); *G06F 3/0446* (2019.05)

(58) Field of Classification Search
CPC .. G06F 3/0362; G06F 3/0393; G06F 3/04164; G06F 3/0446; H01H 19/14; H01H 2019/006
See application file for complete search history.

(56) References Cited

U.S. PATENT DOCUMENTS 10,963,075 B2 * 3/2021 Togashi ............... G02F 1/13338
10,976,835 B2 * 4/2021 Hori ..................... G06F 3/04186
(Continued)

FOREIGN PATENT DOCUMENTS

CN 117492587 A * 2/2024
DE 202018000111 U1 * 5/2019
(Continued)

OTHER PUBLICATIONS

International Search Report issued in corresponding International Patent Application No. PCT/JP2020/006637, dated Apr. 28, 2020, with English translation.

*Primary Examiner* — Temesghen Ghebretinsae
*Assistant Examiner* — Karin Kiyabu
(74) *Attorney, Agent, or Firm* — Rimon P.C.

(57) ABSTRACT

An input device includes a contact board, a rotary click cam, and fixed electrodes. The contact board is placed on a front surface of a touchscreen panel. The rotary click cam is provided rotatably around a rotational axis with respect to the contact board. The fixed electrodes are arranged on a lower surface of the contact board. The fixed electrodes are configured to, as the rotary click cam is operated, be switched from an electrically conductive state into an electrically non-conductive state, or vice versa. The fixed electrode includes a first shifted portion shifted by a first predetermined distance with respect to the fixed electrode.

(Continued)

The fixed electrode includes a second shifted portion shifted by a second predetermined distance with respect to the fixed electrode.

17 Claims, 20 Drawing Sheets

(51) Int. Cl.
*G06F 3/041* (2006.01)
*G06F 3/044* (2006.01)

(56) References Cited

U.S. PATENT DOCUMENTS

| | | | | |
|---|---|---|---|---|
| 11,360,614 | B1* | 6/2022 | Fong | H01H 25/06 |
| 11,435,862 | B2* | 9/2022 | Sasaki | G06F 3/0488 |
| 11,635,858 | B2* | 4/2023 | Hoch | G06F 3/0446 |
| | | | | 345/174 |
| 11,650,675 | B2* | 5/2023 | Martin | G06F 3/0393 |
| | | | | 345/156 |
| 11,650,694 | B2* | 5/2023 | Kakinoki | G06F 3/03548 |
| | | | | 345/174 |
| 2017/0316901 | A1 | 11/2017 | Sawada et al. | |
| 2019/0080864 | A1 | 3/2019 | Sawada et al. | |
| 2020/0064951 | A1* | 2/2020 | Bauer | H03K 17/955 |
| 2020/0104006 | A1* | 4/2020 | Rao | G07C 5/0808 |
| 2022/0236814 | A1* | 7/2022 | Schmidt | G06F 3/0446 |
| 2022/0317785 | A1* | 10/2022 | Kleffel | G06F 3/0393 |
| 2022/0374084 | A1* | 11/2022 | Orita | G06F 3/0383 |

FOREIGN PATENT DOCUMENTS

| | | | | |
|---|---|---|---|---|
| JP | 2015-153369 A | | 8/2015 | |
| JP | 2016-219342 A | | 12/2016 | |
| JP | 2020126384 A | * | 8/2020 | G06F 3/0338 |
| WO | 2016/075907 A1 | | 5/2016 | |
| WO | WO-2020110455 A1 | * | 6/2020 | G06F 3/0362 |
| WO | WO-2020246076 A1 | * | 12/2020 | |
| WO | WO-2021084811 A1 | * | 5/2021 | |
| WO | WO-2021130990 A1 | * | 7/2021 | |
| WO | WO-2021210240 A1 | * | 10/2021 | G06F 3/0362 |

* cited by examiner

INPUT DEVICE AND INPUT SYSTEM

CROSS-REFERENCE OF RELATED APPLICATIONS

This application is the U.S. National Phase under 35 U.S.C. § 371 of International Patent Application No. PCT/JP2020/006637, filed on Feb. 19, 2020, which in turn claims the benefit of Japanese Patent Application No. 2019-107485, filed on Jun. 7, 2019, the entire disclosures of which Applications are incorporated by reference herein.

TECHNICAL FIELD

The present disclosure generally relates to an input device and an input system, and more particularly relates to an input device provided on the front surface of a touchscreen panel and an input system including the input device and the touchscreen panel.

BACKGROUND ART

Patent Literature 1 discloses a rotary operating input device. This input device includes a rotary operating knob, a moving electrode, and a plurality of fixed electrodes. The rotary operating knob is provided on the front surface of a touchscreen panel. The plurality of fixed electrodes are arranged to face, and be spaced from, a plurality of sensor electrodes provided in the touchscreen panel. The moving electrode is provided for the rotary operating knob so as to come into, and out of, contact with the fixed electrodes as the rotary operating knob is turned. As the operator turns the rotary operating knob, the moving electrode moves accordingly. This movement causes a variation in electrostatic capacitance produced between the fixed electrodes and the sensor electrodes. When this variation in electrostatic capacitance is detected by the touchscreen panel, the rotary operation on the rotary operating knob is detected by the touchscreen panel.

The input device of this type may be provided within only a certain range on the front surface of the touchscreen panel.

CITATION LIST

Patent Literature

Patent Literature 1: WO 2016/075907 A1

SUMMARY OF INVENTION

An object of the present disclosure is to provide an input device and an input system, both of which are configured to allow the input device to be provided at any location on the front surface of a touchscreen panel and also enable the touchscreen panel to detect an operation performed on the input device.

An input device according to an aspect of the present disclosure includes a base member, an operating member, a first fixed electrode, and a second fixed electrode. The base member is placed on a front surface of a touchscreen panel. The operating member is provided rotatably around a rotational axis with respect to the base member. The first fixed electrode and the second fixed electrode are arranged on a principal surface of the base member. The first fixed electrode and the second fixed electrode are configured to, as the operating member is operated, be switched from an electrically conductive state into an electrically non-conductive state, or vice versa. The touchscreen panel includes one or more first line electrodes and a plurality of second line electrodes. The first line electrode has a portion overlapping with the first fixed electrode when viewed along a normal to the front surface of the touchscreen panel. The first line electrode extends along a longitudinal axis thereof. The plurality of second line electrodes intersects with the one or more first line electrodes when viewed along the normal to the front surface of the touchscreen panel. All of a plurality of tangential lines extending along the longitudinal axis of the one or more first line electrodes and being in contact with outer end edges of the first fixed electrode when viewed along the normal to the front surface of the touchscreen panel includes a first tangential line and a second tangential line The first tangential line is located more distant, in a first direction intersecting with the longitudinal axis, from a particular first line electrode out of the one or more first line electrodes than any other one of the plurality of tangential lines. The second tangential line is located more distant, in a second direction opposite from the first direction, from the particular first line electrode than any other one of the plurality of tangential lines.

All of a plurality of tangential lines extending along the longitudinal axis of the one or more first line electrodes and being in contact with outer end edges of the second fixed electrode when viewed along the normal to the front surface of the touchscreen panel include a third tangential line and a fourth tangential line. The third tangential line is located more distant, in the first direction, from the particular first line electrode than any other one of the plurality of tangential lines. The fourth tangential line is located more distant, in the second direction, from the third tangential line than any other one of the plurality of tangential lines. The first fixed electrode includes a first shifted portion shifted by a first predetermined distance between the second tangential line and the fourth tangential line with respect to the second fixed electrode. The second fixed electrode includes a second shifted portion shifted by a second predetermined distance between the first tangential line and the third tangential line with respect to the first fixed electrode.

An input system according to another aspect of the present disclosure includes the input device described above and the touchscreen panel.

DESCRIPTION OF EMBODIMENTS

An input system according to an exemplary embodiment will now be described in detail with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor as long as the advantages of the present disclosure are achievable.

EMBODIMENT

An input system 1 according to an exemplary embodiment will be described with reference to FIGS. 1-9.

Figure 1:
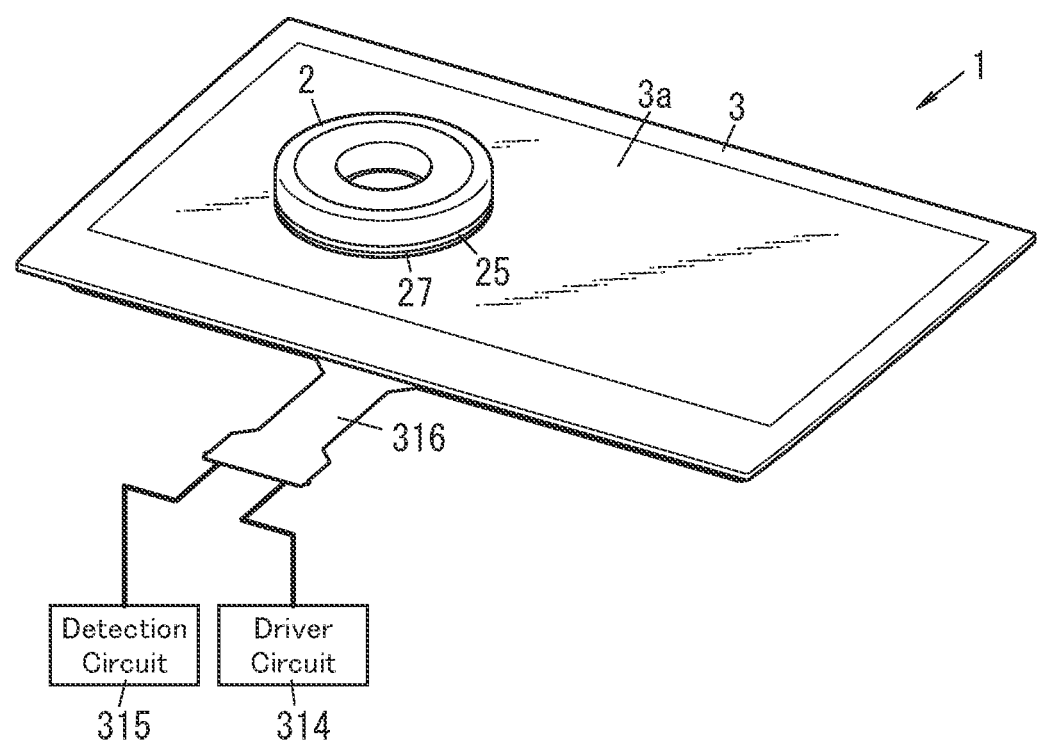
FIG. 1 is a perspective view illustrating an input system according to an exemplary embodiment.
Figure 2:
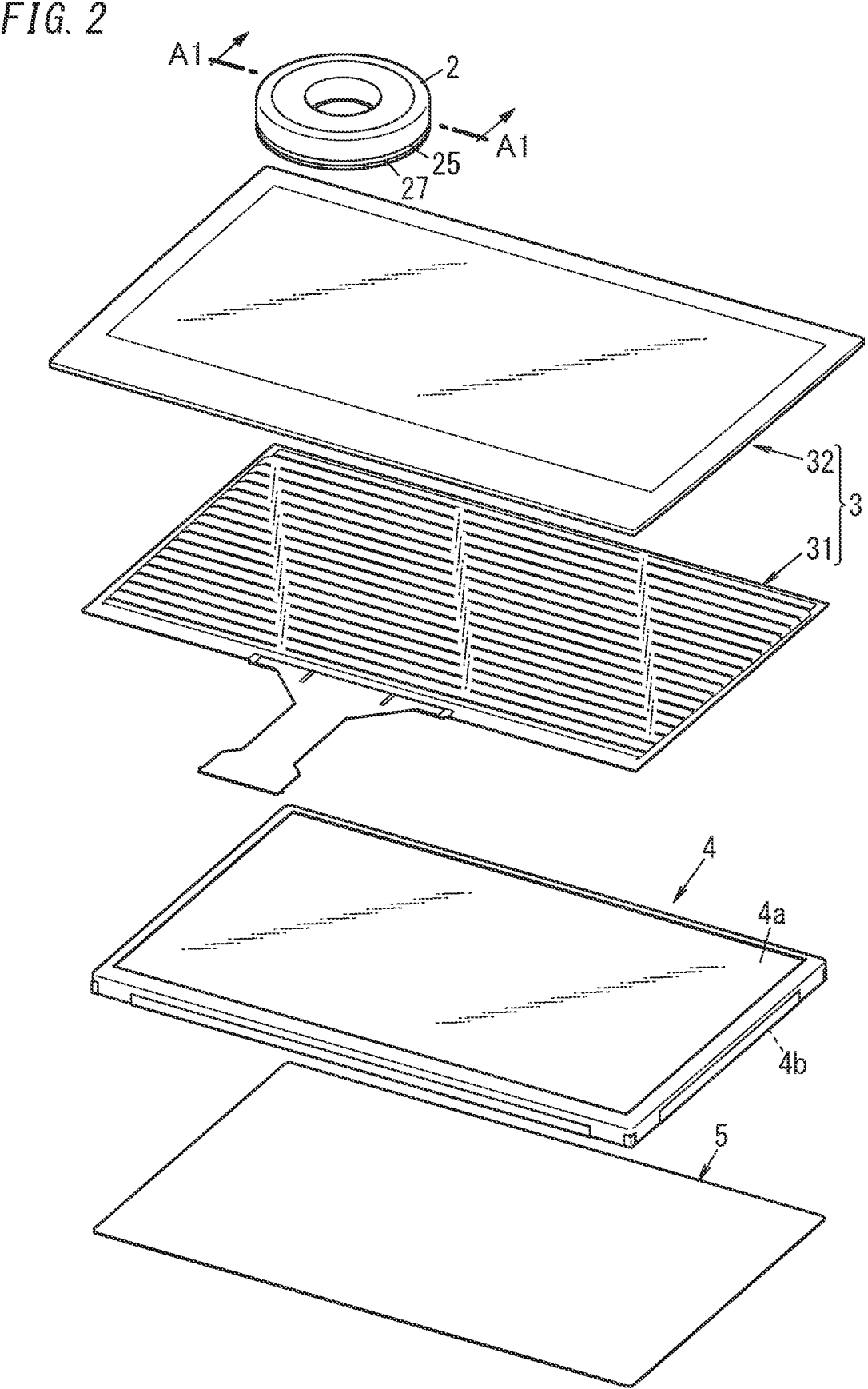
FIG. 2 is an exploded perspective view illustrating the input system.

As shown in FIGS. 1 and 2, the input system 1 includes an input device 2, a touchscreen panel 3, a display device 4, and a metallic plate 5.

The input device 2 is a rotary operating input device to accept a rotary operation performed by an operator. The input device 2 includes a magnet 26 (see FIG. 3) to be removably attracted toward the metallic plate 5 by magnetic force. In this embodiment, the input device 2 is fixed onto the front surface of the touchscreen panel 3 by having the magnet 26 attracted toward the metallic plate 5 by magnetic force. However, the means for fixing the input device 2 onto the front surface of the touchscreen panel 3 does not have to be the magnet 26 but may also be a suction disk to be sucked onto the front surface of the touchscreen panel 3. The display device 4 may be, for example, a thin display device (such as a liquid crystal display or an organic electroluminescent display) which may display various types of information thereon. As the display device 4, a known general-purpose display device may be used.

The touchscreen panel 3 is a device which is installed on a display screen 4a of the display device 4 to detect a point of touch by the operator onto the display screen 4a. As used herein, the "point of touch" refers to a location on the display screen 4a where the operator has put his or her finger. The touchscreen panel 3 includes a touchscreen panel body 31 and a cover panel 32. The touchscreen panel body 31 is a member for detecting the point of touch by the operator onto the display screen 4a. The touchscreen panel body 31 is provided for the display screen 4a to cover the display screen 4a entirely. The cover panel 32 is a member which forms the front surface 3a of the touchscreen panel 3 and which is made of a transparent material (such as a resin or glass) and formed in the shape of a sheet.

In this embodiment, the touchscreen panel 3 is a transparent panel with transparency and is placed on the display screen 4a of the display device 4 such that the display screen 4a is viewable for the operator through the touchscreen panel 3. However, this is only an example and should not be construed as limiting. Alternatively, the touchscreen panel 3 may also be an opaque panel with no transparency. In that case, the display device 4 may be omitted. Still alternatively, the touchscreen panel 3 may also be a partially transparent panel, of which an outer peripheral edge portion has no transparency but an inner portion, inside the outer peripheral edge portion, has transparency. In that case, the inner portion (i.e., the portion with transparency) of the touchscreen panel is placed on the display screen 4a of the display device 4. Then, the input device 2 may be provided on either the inner portion (i.e., the portion with transparency) of the touchscreen panel 3 or the outer peripheral edge portion (i.e., the portion with no transparency), whichever is appropriate.

The metallic plate 5 is a member to be attracted removably toward the magnet 26 of the input device 2 by magnetic force. The metallic plate 5 may be made of a magnetic material such as iron. The metallic plate 5 is provided for a back surface 4b of the display device 4 to cover the back surface 4b of the display device 4 entirely.

In this input system 1, the input device 2 is provided at an arbitrary location on the front surface 3a of the touchscreen panel 3. At that location, the input device 2 has its magnet 26 attracted toward the metallic plate 5 by magnetic force to be fixed at the arbitrary location on the front surface 3a of the touchscreen panel 3. When a rotary operation is performed on the input device 2 provided at such a location, the rotary operation is detected by a point of touch detection function of the touchscreen panel 3.

A plurality of sensor electrodes, provided for the touchscreen panel, are electrodes dedicated to forming electrostatic capacitance between a plurality of fixed electrodes of the input device and the sensor electrodes themselves. Thus, the known input device described above may be provided only within a limited range on the front surface of the touchscreen panel where the plurality of sensor electrodes are provided. That is to say, the known input device may be provided only within a certain range on the front surface of the touchscreen panel.

In contrast, in the input system 1 according to the exemplary embodiment, the input device 2 may be provided at any location on the front surface 3a of the touchscreen panel 3 as described above.

Next, the respective constituent elements of the input system 1 will be described in detail. First, the input device 2 will be described with reference to FIG. 3.

Figure 3:
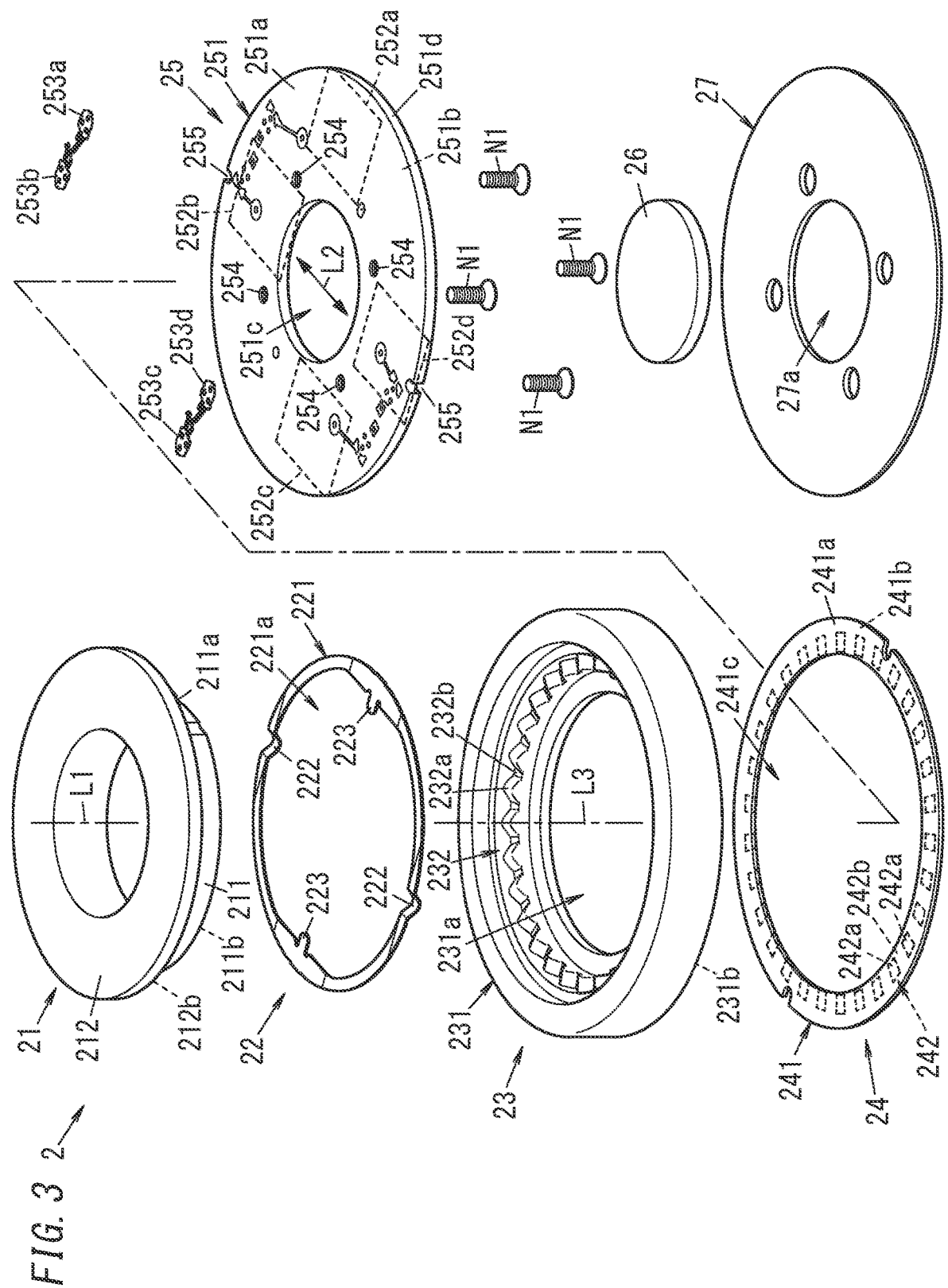
FIG. 3 is an exploded perspective view illustrating an input device included in the input system.

As shown in FIG. 3, the input device 2 includes a rotary core portion 21, a click spring 22, a rotary click cam 23 (operating member), a rotary contact plate 24, a contact board 25 (base member), a magnet 26, and an elastic sheet 27.

The rotary core portion 21 is a member for mounting the rotary click cam 23 rotatably onto the contact board 25. The rotary core portion 21 has a circular shape in a top view. The rotary core portion 21 includes a circular cylindrical portion 211 and a flange portion 212. The flange portion 212 is an annular portion protruding outward (i.e., toward the outer periphery) from the top of the circular cylindrical portion 211. On a lower surface 212b (see FIG. 4) of the flange portion 212, placed is the click spring 22.

The circular cylindrical portion 211 includes positioning groove portions 211a. Each positioning groove portion 211a is a portion to catch a projection 223 of the click spring 22. The positioning groove portion 211a is provided on the outer peripheral surface of the circular cylindrical portion 211 and extends along a cylinder axis L1 of the circular cylindrical portion 211. One longitudinal end of the positioning groove portion 211a is open at a bottom surface 211b of the circular cylindrical portion 211. That is to say, the projection 223 of the click spring 22 may enter the positioning groove portion 211a through the lower opening of the positioning groove portion 211a. Two positioning groove portions 211a may be provided in two circumferential regions along the outer periphery of the circular cylindrical portion 211. The positioning groove portions 211a may be arranged at regular intervals along the circumference of the circular cylindrical portion 211. Note that the positioning groove portions 211a do not have to be provided at regular intervals along the circumference of the circular cylindrical portion 211. In addition, the number of the regions provided with the positioning groove portions 211a does not have to be two but may be any other number as long as the positioning groove portion 211a is provided in at least one region.

The click spring 22 is made of an elastic metal and is formed in the shape of an annular thin plate in a top view. The click spring 22 includes a click spring body 221, two protrusions 222, and the two projections 223. The click spring body 221 has the shape of an annular thin plate with a center hole 221a. The protrusions 222 protrude downward from the lower surface of the click spring body 221 and each have an arc-shaped profile. The protrusions 222 are arranged at regular intervals along the circumference of the click spring body 221. The projections 223 are portions to be fitted into the positioning groove portions 211a of the rotary core portion 21. The projections 223 protrude from the inner circumferential edge of the click spring body 221 into the center hole 221a. The projections 223 are arranged at regular intervals along the circumference of the click spring body 221. The protrusions 222 and the projections 223 are alternately arranged at regular intervals along the circumference of the click spring body 221.

The click spring 22 is arranged along the outer periphery of the circular cylindrical portion 211 of the rotary core portion 21 and put on the lower surface 212b of the flange portion 212 of the rotary core portion 21. The projections 223 of the click spring 22 are fitted into the positioning groove portions 211a of the circular cylindrical portion, thereby fixing the click spring 22 with respect to the circumference of the circular cylindrical portion.

The rotary click cam 23 is a part serving as a rotary operating knob that accepts a rotary operation performed by the operator. The rotary click cam 23 is provided to be rotatable around a rotational axis L3 with respect to the contact board 25. The rotary click cam 23 may be made of a synthetic resin, for example. The rotary click cam 23 includes a rotary click cam body 231 and an uneven portion 232. The rotary click cam body 231 is an annular member with a center hole 231a. The center hole 231a is a hole that penetrates through the central area of the rotary click cam body 231. Into the center hole 231a, the circular cylindrical portion 211 of the rotary core portion 21 is inserted. Fixing the contact board 25 onto the bottom surface 211b of the circular cylindrical portion 211 as will be described later with the circular cylindrical portion 211 inserted into the center hole 231a allows the rotary click cam 23 to be held rotatably by the rotary core portion 21 and the contact board 25.

The uneven portion 232 is provided on an inner peripheral surface of the rotary click cam body 231. The uneven portion 232 is formed to be upwardly uneven. The uneven portion 232 is provided along the entire circumference of the rotary click cam 23. In the uneven portion 232, a plurality of upwardly protruding raised portions 232a and a plurality of downwardly depressed recesses 232b are alternately arranged. Bringing the protrusions 222 of the click spring 22 into elastic contact with the upper surface of the uneven portion 232 gives the operator a sense of clicking when he or she turns the rotary click cam 23 to a predetermined angle of rotation.

The rotary click cam body 231 has a recessed groove 231c (see FIG. 4), in which the rotary contact plate 24 is placed. The recessed groove 231c is provided as a recess on the lower surface 231b of the rotary click cam body 231. The recessed groove 231c is provided as an annular groove along the entire circumference of the lower surface 231b of the rotary click cam body 231. The rotary contact plate 24 is put on a ceiling surface 231d (see FIG. 4) of the recessed groove 231c.

The rotary contact plate 24 is an annular plate member. The rotary contact plate 24 includes a rotary contact plate body 241 and a moving electrode 242. The rotary contact plate body 241 is an insulating substrate (i.e., a substrate with electrical insulation properties) and has the shape of an annular plate with a center hole 241c. The moving electrode 242 is provided on the lower surface 241b of the rotary contact plate body 241 to form conductive areas 242a having a predetermined pattern. The moving electrode 242 forms a pattern in which a plurality of conductive areas 242a, each having a rectangular or fan-shaped trapezoidal shape, for example, are arranged at (regular) intervals along the entire circumference of the rotary contact plate body 241. As used herein, the "fan-shaped trapezoidal shape" refers to a trapezoid, of which the top and bottom sides have the shape of an arc along the circumference of the rotary contact plate 24 and the two lateral sides are parallel to the diameter of the rotary contact plate 24. The rest of the lower surface of the rotary contact plate body 241, other than the conductive areas 242a, is an insulating area. The moving electrode 242 may be either an evaporated pattern or a copper pattern or may also be insert-molded into the rotary contact plate body 241 made of a resin. Alternatively, the moving electrode 242 may also be directly insert-molded into the rotary click cam 23.

Figure 4:
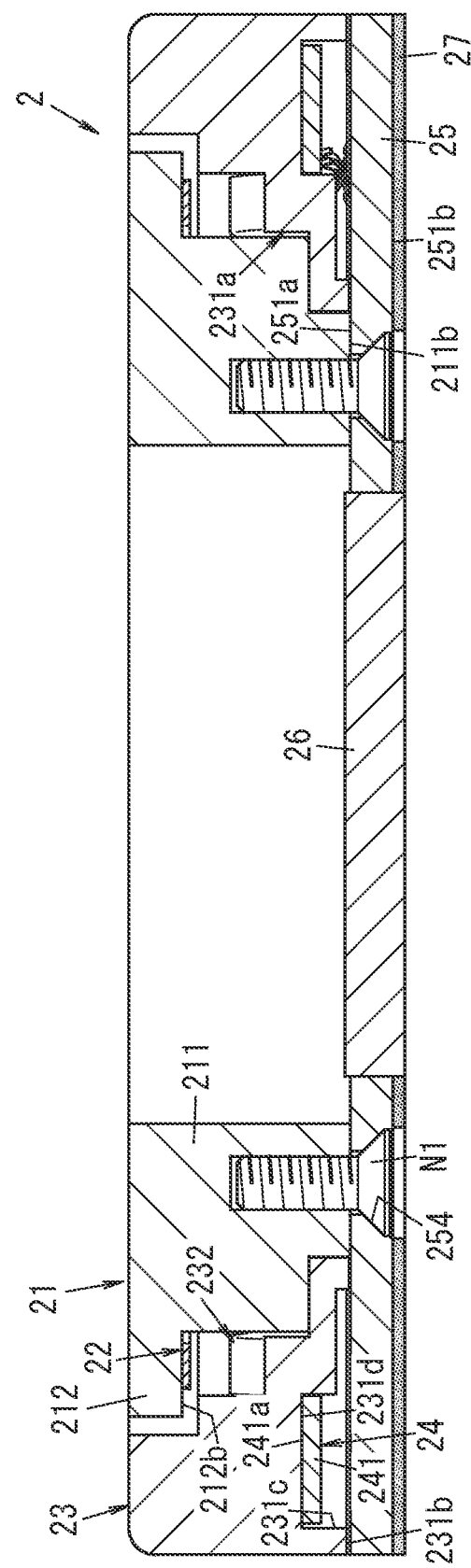
FIG. 4 is a cross-sectional view of the input device taken along the plane A1-A1 shown in FIG. 2.

The upper surface 241a of the rotary contact plate body 241 is fixed with a double-sided adhesive tape, for example, onto the ceiling surface 231d of the recessed groove 231c of the rotary click cam 23 (see FIG. 4). That is to say, the moving electrode 242 is provided for the rotary click cam 23. Fixing the upper surface 241a of the rotary contact plate body 241 onto the ceiling surface 231d of the rotary click cam 23 allows the rotary contact plate 24 to rotate along with the rotary click cam 23. Thus, the moving electrode 242 rotates (i.e., moves) along with the rotary click cam 23. Contactors 61 of the contact board 25 come into elastic contact with the lower surface 241b (i.e., the surface with the moving electrode 242) of the rotary contact plate body 241.

The contact board 25 is provided on the front surface 3a of the touchscreen panel 3. The contact board 25 includes a contact board body 251, a plurality of (e.g., four) fixed electrodes 252a-252d, and a plurality of (e.g., four) brushes 253a-253d. The four fixed electrodes 252a-252d are associated one to one with the four brushes 253a-253d.

The contact board body 251 is an insulating substrate. The contact board body 251 has the shape of an annular plate with a center hole 251c. Into the center hole 251c, the magnet 26 with a disk shape is fitted. The contact board body 251 may have a plurality of (e.g., four) fixing holes 254. The four fixing holes 254 are through holes, through which screws N1 are passed to fix the rotary core portion 21. The four fixing holes 254 are arranged at regular intervals along an inner peripheral edge portion of the contact board body 251.

On the lower surface 251b (principal surface) of the contact board body 251, the four fixed electrodes 252a-252d are provided. The fixed electrodes 252a-252d overlap, when the input device 2 is placed on the front surface 3a of the touchscreen panel 3, partially with the first line electrodes X1 (see FIGS. 8 and 9) of the touchscreen panel 3 to cause a variation in electrostatic capacitance in those overlapping areas. The fixed electrodes 252a-252d will be described in detail later.

On the upper surface 251a of the contact board body 251, the four brushes 253a-253d are provided. The respective brushes 253a-253d are electrically connected to wiring provided on the upper surface 251a of the contact board body 251. Each portion of the wiring is electrically connected to an associated one of the fixed electrodes 252a-252d via a contact hole (through hole) 63 (see FIG. 5) provided through the contact board body 251. In this manner, each of the brushes 253a-253d is electrically connected to an associated one of the fixed electrodes 252a-252d via an associated portion of the wiring and an associated contact hole. The brushes 253a-253d will be described in detail later.

The contact board body 251 has two markers 255. The two markers 255 serve as markers indicating the arrangement of the four fixed electrodes 252a-252d on the contact board body 251. The two markers 255 are provided as cutouts on the outer peripheral surface 251d of the contact board body 251. The two markers 255 may be provided, for example, on the outer peripheral surface 251d of the contact board body 251 to be located at both ends of a diameter parallel to an orthogonal direction L2 (to be described later) (i.e., the diameter of the contact board body 251). The outer peripheral surface 251d (i.e., the surface with the markers 255) of the contact board body 251 is exposed to the outside on the outer peripheral surface of the input device 2. This makes the markers 255 externally recognizable from outside of the outer periphery of the input device 2.

The operator places the input device 2 on the front surface 3a of the touchscreen panel 3 such that a virtual line connecting the two markers 255 together is aligned with the vertical direction on the front surface 3a of the touchscreen panel 3 (i.e., the longitudinal axis of the first line electrodes X1 of the touchscreen panel 3). This allows the operator to place the input device 2 on the front surface 3a of the touchscreen panel 3 such that the orthogonal direction L2 of the input device 2 is aligned with the longitudinal axis of the first line electrodes X1. Note that the number of the markers 255 provided does not have to be two but may also be any other number as long as at least one marker 255 is provided.

The contact board 25 is fixed onto the bottom surface 211b of the circular cylindrical portion 211 of the rotary core portion 21 such that the rotary click cam 23 is sandwiched between the flange portion 212 of the rotary core portion 21 and the contact board 25 as shown in FIG. 4. In this fixed state, the bottom surface 211b of the circular cylindrical portion 211 of the rotary core portion 21 comes into contact with an inner peripheral edge portion of the upper surface 251a of the contact board 25. Screwing the screws N1 from under the lower surface 251b of the contact board 25 through the fixing holes 254 into the screw holes of the bottom surface 211b of the circular cylindrical portion 211 of the rotary core portion 21 allows the upper surface 251a of the contact board 25 to be fixed onto the bottom surface 211b of the circular cylindrical portion 211 of the rotary core portion 21.

In addition, in this fixed state, the circular cylindrical portion 211 of the rotary core portion 21 is inserted rotatably into the center hole 231a of the rotary click cam 23. In this inserted state, the rotary click cam 23 is held rotatably by the rotary core portion 21 and the contact board 25. The lower surface 231b of the rotary click cam 23 is in contact with the upper surface 251a of the contact board 25. The uneven portion 232 of the rotary click cam 23 is in elastic contact with the protrusions 222 of the click spring 22 (see FIG. 3) put on the lower surface 212b of the flange portion 212 of the rotary core portion 21. This gives the operator a sense of clicking when the rotary click cam 23 is turned around the rotary core portion 21 to a predetermined angle of rotation.

Referring back to FIG. 3, the elastic sheet 27 serves as an anti-slip member (such as a rubber member). The elastic sheet 27 is put on the lower surface 251b (i.e., the surface opposite from the surface on which the rotary click cam 23 is put) of the contact board 25. When the input device 2 is placed on the front surface 3a of the touchscreen panel 3, the elastic sheet 27 will be sandwiched between the contact board 25 and the front surface 3a of the touchscreen panel 3 (see FIG. 1). Then, the elastic sheet 27 reduces the chances of the contact board 25 being rotated by the rotational torque of the rotary click cam 23 with respect to the front surface 3a of the touchscreen panel 3. The elastic sheet 27 is made of a material with elasticity (such as rubber elasticity) and formed in the shape of an annular sheet with a center hole 27a. Through the center hole 27a of the elastic sheet 27, the magnet 26 attached to the contact board 25 is exposed (see FIG. 4).

Next, the brushes 253a-253d will be described in detail with reference to FIGS. 5 and 6.

Figure 5:
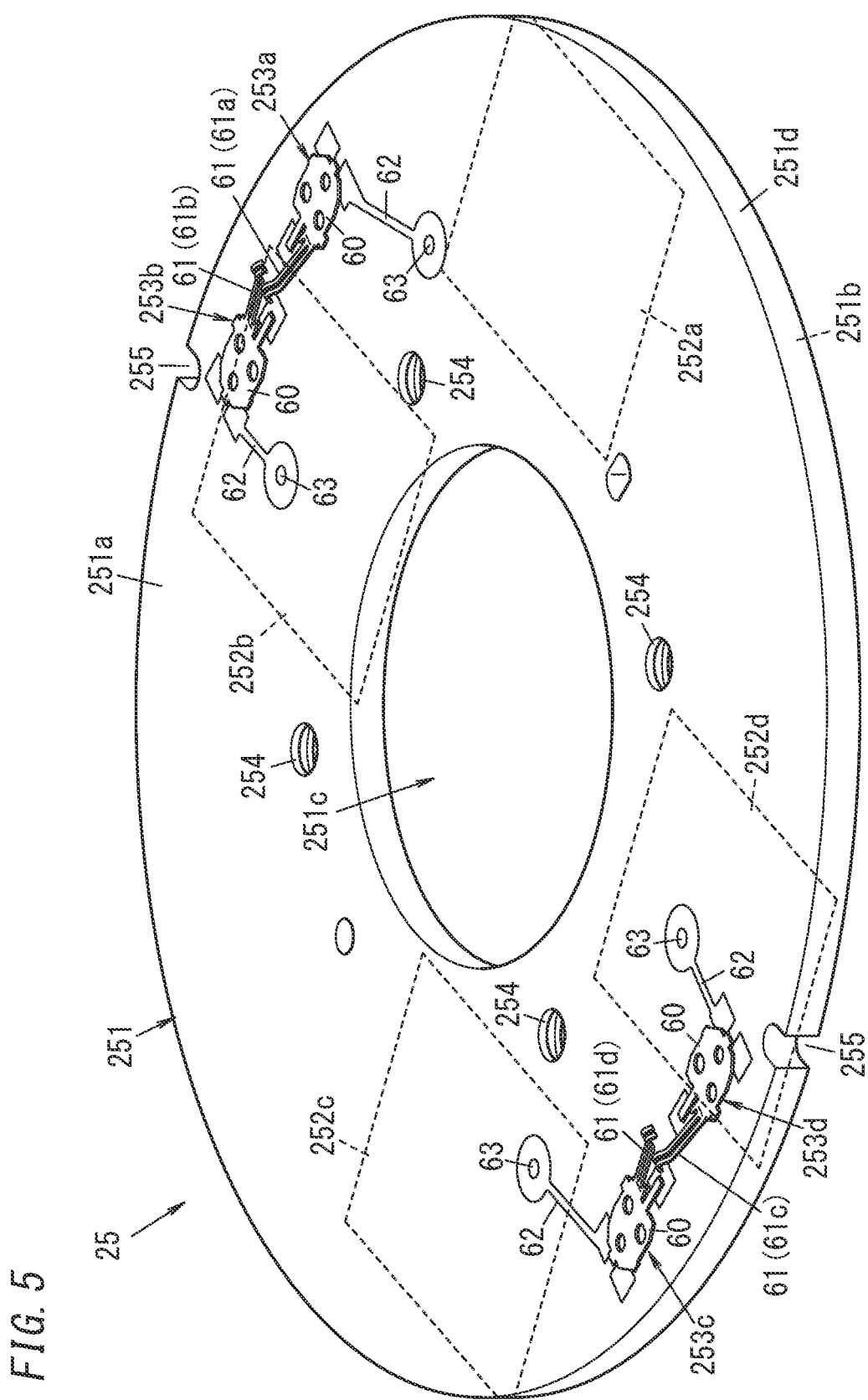
FIG. 5 is a perspective view of a contact board of the input device as viewed from above the upper surface thereof.

As shown in FIG. 5, each of the four brushes 253a-253d is a part formed out of a thin metal plate with elasticity and electrically connected to the moving electrode 242 of the rotary contact plate 24. The four brushes 253a-253d are associated one to one with the four fixed electrodes 252a-252d, respectively. Each of the brushes 253a-253d is provided on the upper surface 251a of the contact board body 251. Each of the brushes 253a-253d includes a fixed portion 60 and a contactor 61. The fixed portion 60 is fixed on the upper surface 251a of the contact board body 251. The contactor 61 is a part to make elastic contact with the lower surface 241b (i.e., the surface with the moving electrode 242) of the rotary contact plate 24. The contactor 61 protrudes obliquely upward from an edge of the fixed portion 60. The respective brushes 253a-253d are formed to have the same shape and the same size. In the following description, when the respective contactors 61 of the brushes 253a, 253b, 253c, 253d need to be distinguished from each other, the contactors 61 will be hereinafter designated by the reference signs 61a, 61b, 61c, and 61d, respectively.

The brushes 253a-253d are electrically connected to the wiring 62 provided on the upper surface 251a of the contact board 25. Each portion of the wiring 62 is electrically connected to an associated one of the fixed electrodes 252a-252d via a contact hole (through hole) 63 provided through the contact board 25. In this manner, each of the brushes 253a-253d is electrically connected to an associated one of the fixed electrodes 252a-252d via the wiring 62 and its associated contact hole 63.

Two out of the four brushes 253a-253d are arranged at one end of the diameter of the center hole 251c of the contact board 25, while the other two brushes 253a-253d are arranged at the other end of the diameter of the center hole 251c. These four brushes 253a-253d form two pairs of brushes. Specifically, the brushes 253a, 253b form one pair, while the brushes 253c, 253d form the other pair. The respective brushes 253a-253d are arranged along an outer peripheral edge of the upper surface 251a of the contact board 25 and are arranged side by side along the circumference of the contact board 25. The respective contactors 61a, 61b of the one pair of brushes 253a, 253b are arranged between the respective fixed portions 60 of the brushes 253a, 253b and are arranged side by side along the diameter of the contact board 25. In the same way, the respective contactors 61c, 61d of the other pair of brushes 253c, 253d are arranged between the respective fixed portions 60 of the brushes 253c, 253d and are arranged side by side along the diameter of the contact board 25. The respective contactors 61a, 61b of the one pair of brushes 253a, 253b are made electrically conductive with each other by coming into contact with the same conductive area 242a of the moving electrode 242 of the rotary contact plate 24. In the same way, the respective contactors 61c, 61d of the other pair of brushes 253c, 253d are also made electrically conductive with each other by coming into contact with the same conductive area 242a of the moving electrode 242 of the rotary contact plate 24.

Figure 6:
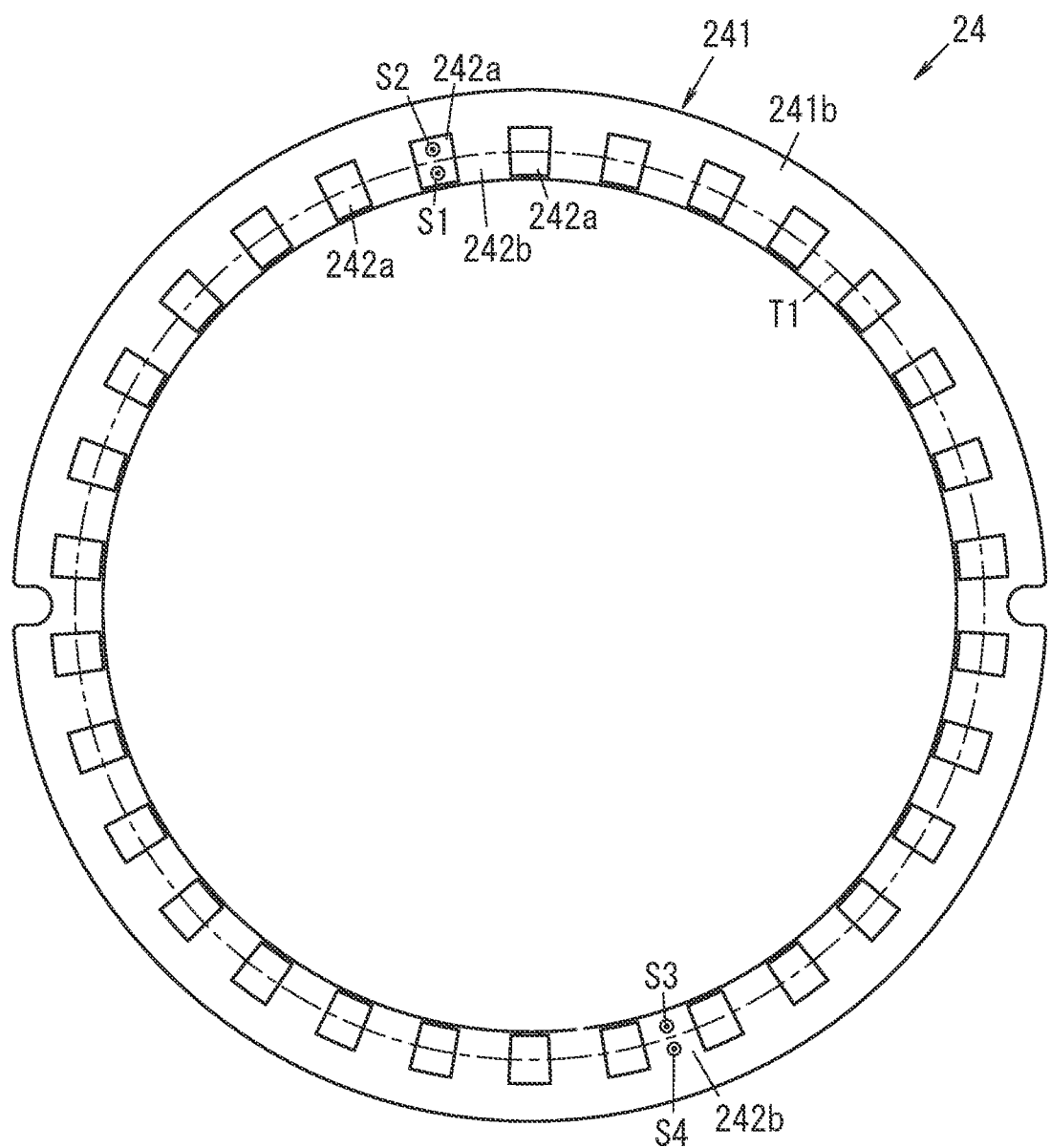
FIG. 6 is a plan view of a rotary contact plate of the input device as viewed from under the lower surface thereof.

In FIG. 6, the double circles ⊚ S1-S4 schematically indicate the locations where the respective contactors 61a-61d of the brushes 253a-253d are arranged. At the locations indicated by these double circles ⊚ S1-S4, the respective contactors 61a-61d of the brushes 253a-253d come into contact with the lower surface 241b of the rotary contact plate 24. The respective contactors 61a, 61b of the one pair of brushes 253a, 253b move relatively along a circular track T1 (see FIG. 6) as the rotary contact plate 24 rotates along with the rotary click cam 23 turning. This brings the contactors 61a, 61b into alternate contact with the conductive areas 242a and the insulating areas 242b of the moving electrode 242 on the lower surface 241b of the rotary contact plate 24. When coming into contact with the same conductive area 242a, the contactors 61a, 61b are electrically conductive with each other. On the other hand, when coming into contact with the same insulating area 242b, the contactors 61a, 61b are electrically non-conductive with each other. In the same way, the respective contactors 61c, 61d of the other pair of brushes 253c, 253d are also made electrically conductive or non-conductive with each other as the rotary contact plate 24 rotates. That is to say, as the rotary click cam 23 rotates, the moving electrode 242 switches the respective contactors 61a, 61b of the brushes 253a, 253b (i.e., the fixed electrodes 252a, 252b) from electrically conductive state into electrically non-conductive state, and vice versa.

To cause a time lag (i.e., a phase shift) between a period in which the respective contactors 61a, 61b of the one pair of brushes 253a, 253b are electrically conductive with each other and a period in which the respective contactors 61c, 61d of the other pair of brushes 253c, 253d are electrically conductive with each other, the one pair of brushes 253a, 253b and the other pair of brushes 253c, 253d are arranged to be shifted from each other along the circumference of the track T1. This phase shift allows more accurately detecting the rotational direction of the rotary operation performed on the input device 2 by the point of touch detection function of the touchscreen panel 3.

Next, the fixed electrodes 252a-252d (more specifically, the fixed electrode 252a (first fixed electrode), the fixed electrode 252b (second fixed electrode), the fixed electrode 252c (first fixed electrode), and the fixed electrode 252d (second fixed electrode)) will be described in detail with reference to FIG. 7.

These four fixed electrodes 252a-252d form two pairs. Specifically, the two fixed electrodes 252a, 252b form one pair, while the two fixed electrodes 252c, 252d form the other pair. The two fixed electrodes 252a, 252b that form one pair are separated from each other. In the same way, the two fixed electrodes 252c, 252d that form the other pair are not only separated from each other but also separated from the fixed electrodes 252a, 252b as well. As can be seen, according to this embodiment, a plurality of first fixed electrodes 252a, 252c and a plurality of second fixed electrodes 252b, 252d are arranged separately from each other on the lower surface 251b (principal surface) of the contact board 25 (base member).

The one pair of fixed electrodes 252a, 252b are associated one to one with the one pair of brushes 253a, 253b and are electrically connected to their associated brushes 253a, 253b, respectively, as described above. The other pair of fixed electrodes 252c, 252d are associated one to one with the other pair of brushes 253c, 253d and are electrically connected to their associated brushes 253c, 253d, respectively, as described above. The one pair of fixed electrodes 252a, 252b become electrically conductive or non-conductive with each other as the respective contactors 61a, 61b of the one pair of their associated brushes 253a, 253b are made electrically conductive or non-conductive with each other. In the same way, the other pair of fixed electrodes 252c, 252d become electrically conductive or non-conductive with each other as the respective contactors 61c, 61d of the other pair of their associated brushes 253c, 253d are made electrically conductive or non-conductive with each other.

The four fixed electrodes 252a-252d are arranged along a circular orbit T2 to be drawn by the rotary contact plate 24 rotating when viewed along the rotational axis L3 of the rotary click cam 23. When viewed along the rotational axis L3 of the rotary click cam 23, the one pair of fixed electrodes 252a, 252b are arranged side by side and adjacent to each other along the circular orbit T2 and the other pair of fixed electrodes 252c, 252d are also arranged side by side and adjacent to each other along the circular orbit T2.

Figure 7:
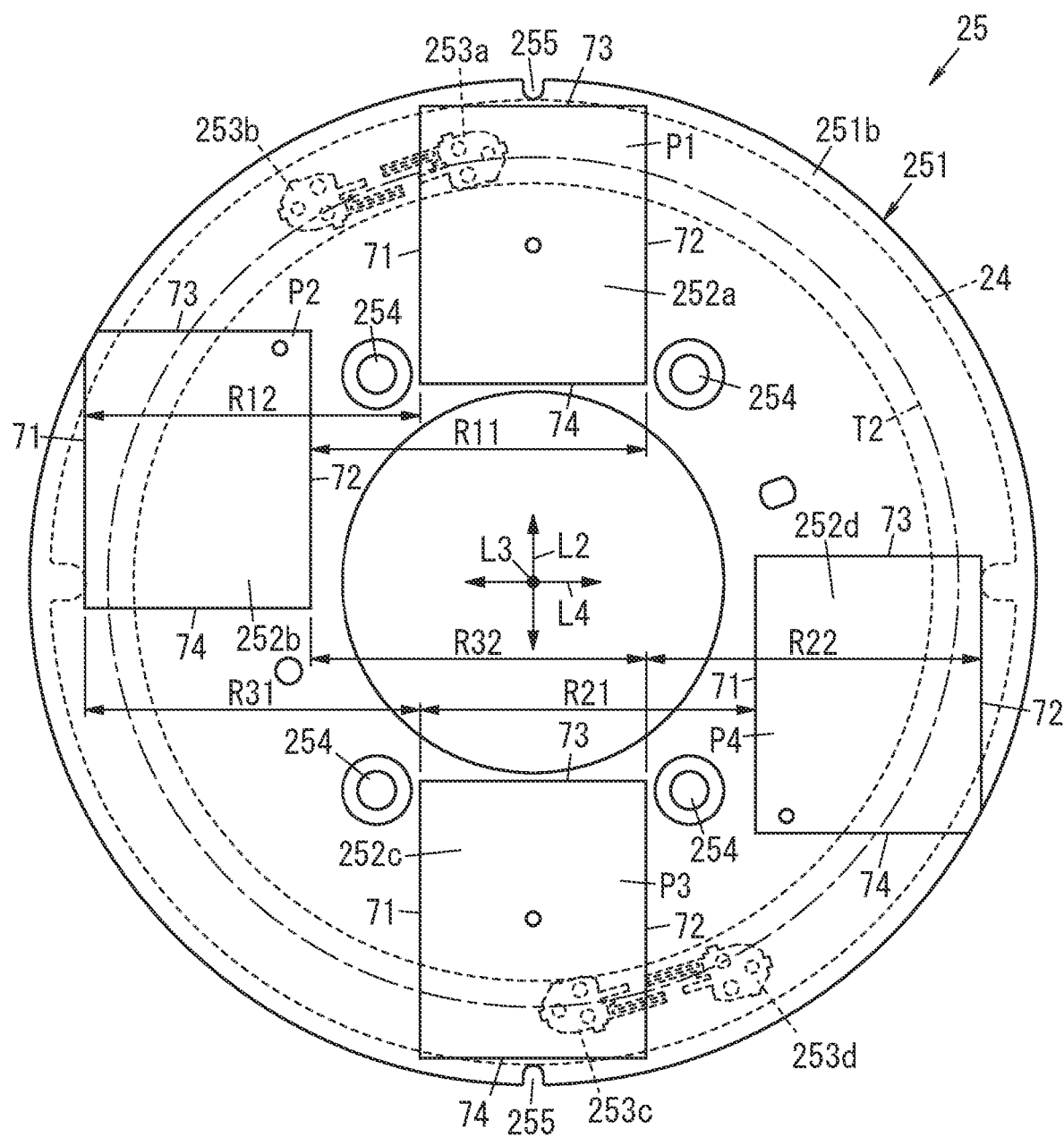
FIG. 7 is a plan view of the contact board as viewed from under the lower surface thereof.
Figure 8:
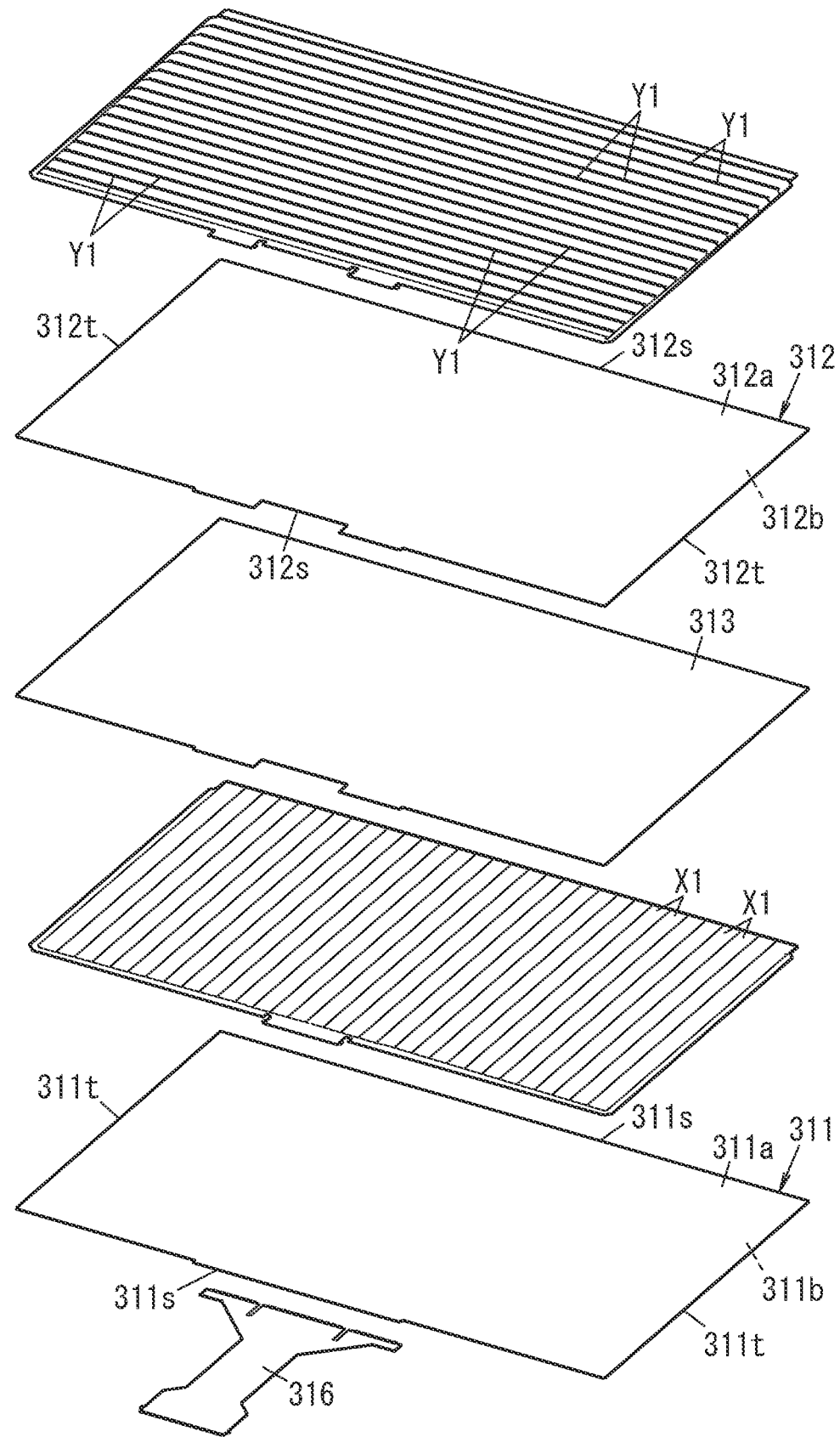
FIG. 8 is an exploded perspective view illustrating a touchscreen panel included in the input system.

The one pair of fixed electrodes 252a, 252b are arranged not to overlap with each other at all in the orthogonal direction L2 (e.g., the upward/downward direction on the paper on which FIG. 7 is drawn). As used herein, the phrase "not to overlap with each other at all" refers to a situation where the width (i.e., the width measured in the particular direction L4) of one fixed electrode (e.g., 252a) does not overlap at all in the orthogonal direction L2 with the width (i.e., the width measured in the particular direction L4) of the other fixed electrode (e.g., 252b). In other words, the fixed electrode 252a is arranged to have a shifted portion P1 (first shifted portion) which is shifted in the particular direction L4 (e.g., the rightward/leftward direction on the paper on which FIG. 7 is drawn) by a predetermined distance R11 (first predetermined distance) with respect to the fixed electrode 252b. The fixed electrode 252b is arranged to have a shifted portion P2 (second shifted portion) which is shifted in the particular direction L4 by a predetermined distance R12 (second predetermined distance) with respect to the fixed electrode 252a. Note that the particular direction L4 is a direction intersecting (e.g., at right angles) with the rotational axis L3 of the rotary click cam 23 and the orthogonal direction L2 is a direction intersecting at right angles with both the rotational axis L3 and the particular direction L4.

The predetermined distance R11 may be, for example, a distance equal to or greater than the width of the fixed electrode 252a as measured in the particular direction L4. Therefore, the shifted portion P1 is the entire fixed electrode 252a and has the same area as the fixed electrode 252a. The predetermined distance R12 may be, for example, a distance equal to or greater than the width of the fixed electrode 252b as measured in the particular direction L4. Therefore, the shifted portion P2 also has the same area as the fixed electrode 252b.

Note that in this embodiment, the fixed electrode 252a has only the shifted portion P1 that is shifted in the particular direction L4 with respect to the fixed electrode 252b, out of the shifted portion P1 and a non-shifted portion that is not shifted in the particular direction L4 with respect to the fixed electrode 252b. Likewise, the fixed electrode 252b has only the shifted portion P2 that is shifted in the particular direction L4 with respect to the fixed electrode 252a, out of the shifted portion P2 and a non-shifted portion that is not shifted in the particular direction L4 with respect to the fixed electrode 252a. Nevertheless, the fixed electrode 252a only needs to include at least the shifted portion P1, out of the shifted portion P1 and the non-shifted portion. In the same way, the fixed electrode 252b only needs to include at least the shifted portion P2, out of the shifted portion P2 and the non-shifted portion.

Note that the shifted portion P1 herein refers to a portion that does not overlap in the orthogonal direction L2 with the fixed electrode 252b. That is to say, the shifted portion P1 is a portion protruding in the particular direction L4 from an end edge in the particular direction L4 of the fixed electrode 252b. The shifted portion P2 is a portion protruding in the particular direction L4 from an end edge in the particular direction L4 of the fixed electrode 252a. The non-shifted portion of the fixed electrode 252a herein refers to a portion overlapping in the orthogonal direction L2 with the fixed electrode 252b. That is to say, the non-shifted portion of the fixed electrode 252a is a portion not protruding in the particular direction L4 from the end edge in the particular direction L4 of the fixed electrode 252b. This statement about the non-shifted portion of the fixed electrode 252a applies to the non-shifted portion of the fixed electrode 252b as well.

In the same way, the other pair of fixed electrodes 252c, 252d are also arranged not to overlap with each other at all in the orthogonal direction L2. In other words, the fixed electrode 252c is arranged to have a shifted portion P3 which is shifted in the particular direction L4 by a predetermined distance R21 with respect to the fixed electrode 252d. The fixed electrode 252d is arranged to have a shifted portion P4 which is shifted in the particular direction L4 by a predetermined distance R22 with respect to the fixed electrode 252c. Each of the predetermined distances R21, R22 may be, for example, a distance equal to or greater than the width of the fixed electrode 252c, 252d as measured in the particular direction L4. In this embodiment, one fixed electrode 252b out of the one pair of fixed electrodes 252a, 252b and one fixed electrode 252c out of the other pair of fixed electrodes 252c, 252d are arranged not to overlap in the orthogonal direction L2 at all with each other. In other words, the fixed electrode 252b is arranged to have a shifted portion P2 which is shifted in the particular direction L4 by a predetermined distance R31 with respect to the fixed electrode 252c. The fixed electrode 252c is arranged to have a shifted portion P3 which is shifted in the particular direction L4 by a predetermined distance R32 with respect to the fixed electrode 252b. Each of the predetermined distances R31, R32 may be, for example, a distance greater than the width of the fixed electrode 252b, 252c as measured in the particular direction L4. Note that the fixed electrode 252b is a fixed electrode located at the end in one direction (e.g., the counterclockwise direction on the paper on which FIG. 7 is drawn) along the circular orbit T2, out of the one pair of fixed electrodes 252a, 252b. The fixed electrode 252c is a fixed electrode located at the end in the other direction (e.g., the clockwise direction on the paper on which FIG. 7 is drawn) along the circular orbit T2, out of the other pair of fixed electrodes 252c, 252d.

The respective fixed electrodes 252a-252d all have the same rectangular shape with the same dimensions. Each of the fixed electrodes 252a-252d has two pairs of opposing sides (namely, opposing sides 71, 72 and opposing sides 73, 74). When viewed along the rotational axis L3 of the rotary click cam 23, the one pair of opposing sides 71, 72 (lateral sides) of each of the fixed electrodes 252a-252d are parallel to the orthogonal direction L2 (i.e., the direction perpendicular to both the particular direction L4 and the rotational axis L3). This increases the chances of the one pair of fixed electrodes 252a, 252b not overlapping with each other at all in the orthogonal direction L2. That is to say, this allows the fixed electrodes 252a, 252b to be arranged such that the fixed electrode 252a has the shifted portion P1 which is shifted in the particular direction L4 by the predetermined distance R11 with respect to the fixed electrode 252b and that the fixed electrode 252b has the shifted portion P2 which is shifted in the particular direction L4 by the predetermined distance R12 with respect to the fixed electrode 252a. In the same way, this may make the other pair of fixed electrodes 252c, 252d not overlapping with each other at all in the orthogonal direction L2. That is to say, this allows the fixed electrodes 252c, 252d to be arranged such that the fixed electrode 252c has the shifted portion P3 which is shifted in the particular direction L4 by the predetermined distance R21 with respect to the fixed electrode 252d and that the fixed electrode 252d has the shifted portion P4 which is shifted in the particular direction L4 by the predetermined distance R22 with respect to the fixed electrode 252c.

The touchscreen panel body 31 includes a plurality of first line electrodes X1, a plurality of second line electrodes Y1, a film substrate 311, a film substrate 312, an optically transparent adhesive sheet 313, a driver circuit 314, and a detection circuit 315. In the following description, when the plurality of first line electrodes X1 need to be distinguished from each other, the plurality of first line electrodes X1 will be hereinafter designated by the reference signs X11, X12, X13, and so on (see FIG. 9). Likewise, when the plurality of second line electrodes Y1 need to be distinguished from each other, the plurality of second line electrodes Y1 will be hereinafter designated by the reference signs Y11, Y12, Y13, and so on (see FIG. 9).

The film substrate 311 is made of a material with transparency (such as a resin or glass). The film substrate 311 is a rectangular sheet with two pairs of opposing sides 311s, 311t. Likewise, the film substrate 312, as well as the film substrate 311, is also a rectangular sheet with two pairs of opposing sides 312s, 312t. The film substrate 312 is a rectangular sheet with the same shape and same dimensions as the film substrate 311. The plurality of first line electrodes X1 and the plurality of second line electrodes Y1 are made of an electrically conductive material with transparency (such as indium tin oxide (ITO)).

The plurality of first line electrodes X1 are formed as a film over the upper surface 311a of the film substrate 311. On the upper surface 311a of the film substrate 311, the plurality of first line electrodes X1 extend parallel to each other along the one pair of opposing sides 311t of the upper surface 311a and are arranged side by side to be spaced apart from each other along the other pair of opposing sides 311s. Each of the plurality of first line electrodes X1 may have a strip shape, for example (see FIG. 9). The plurality of first line electrodes X1 are connected to the driver circuit 314 via a flexible printed wiring board 316. Optionally, the first line electrodes X1 may include a plurality of broader portions and a plurality of narrower portions. In that case, the broader portions and the narrower portions are alternately arranged to extend along the longitudinal axis of the first line electrodes X1. Between a plurality of first line electrodes X1 which are adjacent to each other, the broader portions are closely adjacent to each other and the narrower portions are adjacent to each other at regular intervals. The broader portions function as capacitor electrodes which may be charged with electrical charges. The front surface 3a of the touchscreen panel 3 is covered both vertically and horizontally with the respective broader portions of the plurality of first line electrodes X1.

The plurality of second line electrodes Y1 are formed as a film over the upper surface 312a of the film substrate 312. On the upper surface 312a of the film substrate 312, the plurality of second line electrodes Y1 extend parallel to each other along the one pair of opposing sides 312s and are arranged side by side other along the other pair of opposing sides 312t. Each of the plurality of second line electrodes Y1 may have an elongate strip shape, for example. The plurality of second line electrodes Y1 are connected to the detection circuit 315 via the flexible printed wiring board 316.

The film substrates 311 and 312 are laid one on top of the other via the optically transparent adhesive sheet 313 to be bonded together. The optically transparent adhesive sheet 313 is sandwiched between the upper surface 311a of the film substrate 311 and the lower surface 312b of the film substrate 312. The optically transparent adhesive sheet 313 is a member obtained by applying a pressure sensitive adhesive onto both sides of a sheet with transparency.

Optionally, the optically transparent adhesive sheet 313 may also consist of only the pressure sensitive adhesive without the sheet portion.

Figure 9:
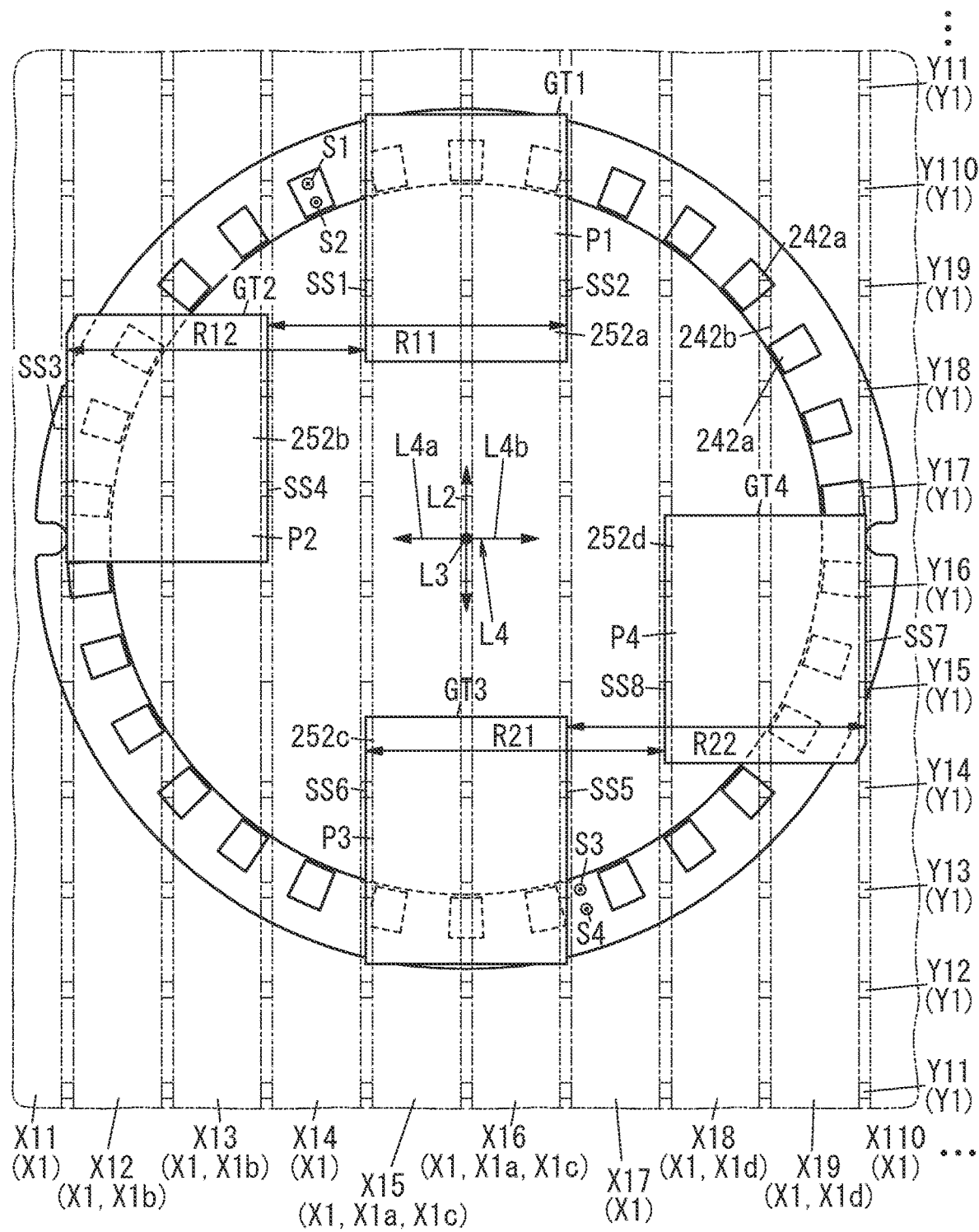
FIG. 9 is a plan view of a first line electrode, a second line electrode, a fixed electrode, and a moving electrode of the input system as viewed from a display device thereof.

In a state where the film substrates 311, 312 are bonded together, the longitudinal axis of the plurality of second line electrodes Y1 intersects (at right angles) with the longitudinal axis of the plurality of first line electrodes X1 when viewed along a normal to the film substrates 311, 312 (see FIG. 9). That is to say, the second line electrodes Y1 extend perpendicularly to the longitudinal axis of the first line electrodes X1. The plurality of first line electrodes X1 and the plurality of second line electrodes Y1 are laid one on top of the other to be spaced apart from each other via the film substrate 312 and the optically transparent adhesive sheet 313.

Onto the upper surface 312a of the film substrate 312, the cover panel 32 (see FIG. 2) is bonded with an optically transparent adhesive sheet (not shown). Onto the lower surface 311b of the film substrate 311, the display screen 4a of the display device 4 (see FIG. 2) is bonded with a double-sided adhesive tape.

The driver circuit 314 selectively applies, on a one-by-one basis (i.e., sequentially), a scan voltage to the plurality of first line electrodes X1 from a first line electrode X11 located at one end toward a first line electrode X1n located at the other end. In addition, the driver circuit 314 also connects the other first line electrodes X1, to which no scan voltage is applied, to a reference potential (i.e., a ground potential).

The detection circuit 315 selectively detects, on a first line electrode X1 basis (i.e., sequentially), while the scan voltage is being applied to a single first line electrode X1, respective voltages at the plurality of second line electrodes Y1 from a second line electrode Y1 located at one end toward a second line electrode Y1 located at the other end. More specifically, the detection circuit 315 is provided with a plurality of ports for the respective second line electrodes Y1. At a certain timing, all of those ports are opened for all of the second line electrodes Y1. While those ports are open, A/D converters, provided for the respective ports, sequentially perform A/D conversion on the voltages at the respective second line electrodes Y1. This allows the detection circuit 315 to detect any second line electrode Y1, of which the electrostatic capacitance has varied. Specifically, when the operator touches, at an arbitrary point, the front surface 3a of the touchscreen panel 3, the electrostatic capacitance of a capacitor electrode (i.e., a broader portion 80) overlapping with the point of touch varies. By detecting such a variation in the voltage at the second line electrode Y1 as described above, the detection circuit 315 detects, based on the locations of the first line electrode X1 and second line electrode Y1 selected at the time of detection, the point of touch on the front surface 3a of the touchscreen panel 3. Such a function of detecting the point of touch will be hereinafter referred to as a "point of touch detection function."

Next, it will be described with reference to FIG. 9 how the input system 1 operates. In FIG. 9, the plurality of first line electrodes X1 extend in the upward/downward direction and are arranged side by side in the rightward/leftward direction on the paper on which FIG. 9 is drawn. On the other hand, the plurality of second line electrodes Y1 extend in the rightward/leftward direction and are arranged one on top of another in the upward/downward direction on the paper on which FIG. 9 is drawn. In FIG. 9, the plurality of second line electrodes Y1 are arranged behind the plurality of first line electrodes X1 (to the eyes of a viewer who is looking along a normal to the paper at FIG. 9), and therefore, are exposed only partially forward (to the eyes of the viewer who is looking along a normal to the paper at FIG. 9) through the gaps between the plurality of first line electrodes X1.

With the input device 2 placed on the front surface 3a of the touchscreen panel 3, the right and left lateral sides (the pair of lateral sides) of each of the fixed electrodes 252a-252d are parallel to the longitudinal axis of the first line electrodes X1 (i.e., the upward/downward direction in FIG. 9). That is to say, each of the fixed electrodes 252a-252d has a pair of lateral sides which are parallel to the longitudinal axis (i.e., extend along the longitudinal axis) of the first line electrodes X1. In addition, with the input device 2 placed on the front surface 3a of the touchscreen panel 3, the plurality of first line electrodes X1 includes at least one (e.g., two in this embodiment) first line electrode X1a partially overlapping with the fixed electrode (first fixed electrode) 252a. As used herein, the "first line electrode X1a partially overlapping with the fixed electrode 252a" refers to the first line electrode X1a, of which a longitudinal part overlaps with the fixed electrode 252a and the entire width in the particular direction L4 falls within the width of the fixed electrode 252a. This statement about the first fixed electrode 252a also applies to the other first line electrodes X1b-X1d to be described later. In addition, in that state, the plurality of first line electrodes X1 includes at least one (e.g., two in this embodiment) first line electrode X1b partially overlapping with the fixed electrode 252b. Furthermore, the plurality of first line electrodes X1 includes at least one (e.g., two in this embodiment) first line electrode X1c partially overlapping with the fixed electrode (third fixed electrode) 252c. Furthermore, in that state, the plurality of first line electrodes X1 includes at least one (e.g., two in this embodiment) first line electrode X1d partially overlapping with the fixed electrode 252d.

Furthermore, with the input device 2 placed on the front surface 3a of the touchscreen panel 3, the orthogonal direction L2 is aligned with a direction along the longitudinal axis of the first line electrodes X1 of the touchscreen panel 3 (e.g., the vertical direction of the front surface 3a of the touchscreen panel 3 in this embodiment). That is to say, in the direction aligned with the longitudinal axis of the first line electrodes X1, one pair of fixed electrodes 252a, 252b do not overlap with each other, and the other pair of fixed electrodes 252c, 252d do not overlap with each other, either. In other words, when viewed along the rotational axis L3 of the rotary click cam 23, the one pair of fixed electrodes 252a, 252b does not overlap with the same first line electrode X1 and the other pair of fixed electrodes 252c, 252d does not overlap with the same first line electrode X1, either.

Furthermore, in the example illustrated in FIG. 9, when viewed along a normal L3 to the front surface 3a of the touchscreen panel 3, the outer end edges GT1 of the fixed electrode 252a are in contact with at least a tangential line SS1 (first tangential line) and a tangential line SS2 (second tangential line). As used herein, the outer end edges GT1 refer to the entire outer peripheral edges of the fixed electrode 252a. All of a plurality of tangential lines which extend along the longitudinal axis of the first line electrodes X1 and are in contact with the outer end edges GT1 of the fixed electrode 252a include the tangential line SS1 (first tangential line) and the tangential line SS2 (second tangential line). The tangential line SS1 and the tangential line SS2 are tangential lines which are parallel to the longitudinal axis of the first line electrodes X1 when viewed along a normal L3 to the front surface 3a of the touchscreen panel 3. Specifically, the tangential line SS1 is in contact with one side in one direction L4a (i.e., on the left) (i.e., the left side) of the fixed electrode 252a, while the tangential line SS2 is in contact with another side in the opposite direction L4b (i.e., on the right) (i.e., the right side) of the fixed electrode 252a. In FIG. 9, the tangential line SS1 and the tangential line SS2 respectively overlap with the entire left side and the entire right side of the fixed electrode 252a. Among a plurality of tangential lines which may be in contact with the outer end edges GT1 of the fixed electrode 252a, the tangential line SS1 is located most distant in one direction L4a from one first line electrode X1a and the tangential line SS2 is located most distant in the opposite direction L4b from the first line electrode X1a. As used herein, the first line electrode X1a refers to one first line electrode X1a (such as the first line electrode X15 or X16 shown in FIG. 9) out of the one or more first line electrodes X1a.

As used herein, the direction L4a (first direction) refers to one direction (e.g., the leftward direction) out of the particular directions L4 (rightward/leftward directions). The direction L4a is a direction intersecting (e.g., at right angles) with the longitudinal axis of the first line electrodes X1. The opposite direction L4b (second direction) herein refers to a direction (e.g., the rightward direction) opposite from the direction L4a. The above-described sentence "among a plurality of tangential lines which may be in contact with the outer end edges GT1, the tangential line SS1 is located most distant in one direction L4a from one first line electrode X1a" means that among a plurality of intervals between points of contact of various tangential lines (including the tangential line SS1) which may be in contact with the outer end edges GT1 and the first line electrode X1a, the interval between the point of contact of the tangential line SS1 with an outer end edge GT1 and the first line electrode X1a is the longest when measured in the direction L4a.

When viewed along a normal L3 to the front surface 3a of the touchscreen panel 3, the outer end edges GT2 of the fixed electrode 252b are in contact with at least a tangential line SS3 (third tangential line) and a tangential line SS4 (fourth tangential line). All of a plurality of tangential lines which extend along the longitudinal axis of the first line electrodes X1 and are in contact with the outer end edges GT2 of the fixed electrode 252b include the tangential line SS3 (third tangential line) and the tangential line SS4 (fourth tangential line). The tangential line SS3 and the tangential line SS4 are tangential lines which are parallel to the longitudinal axis of the first line electrodes X1. Specifically, the tangential line SS3 is in contact with one side in one direction L4a (i.e., on the left) (i.e., the left side) of the fixed electrode 252b, while the tangential line SS4 is in contact with another side in the opposite direction L4b (i.e., on the right) (i.e., the right side) of the fixed electrode 252b. In FIG. 9, the tangential line SS3 and the tangential line SS4 respectively overlap with the entire left side and the entire right side of the fixed electrode 252b. Among a plurality of tangential lines which may be in contact with the outer end edges GT2 of the fixed electrode 252b, the tangential line SS3 is located most distant in one direction L4a from one first line electrode X1a and the tangential line SS4 is located most distant in the opposite direction L4b from the tangential line SS3.

The above-described sentence "among a plurality of tangential lines which may be in contact with the outer end edges GT2, the tangential line SS3 is located most distant in one direction L4a from one first line electrode X1a" is based on the same idea as the above-described sentence "among a plurality of tangential lines which may be in contact with the outer end edges GT1, the tangential line SS1 is located most distant in one direction L4a from one first line electrode X1a." The above-described sentence "among a plurality of tangential lines which may be in contact with the outer end edges GT2, the tangential line SS4 is located most distant in the opposite direction L4b from the tangential line SS3" means that among a plurality of intervals between points of contact of various tangential lines (including the tangential line SS4) which may be in contact with the outer end edges GT2 and the tangential line SS3, the interval between the point of contact of the tangential line SS4 with an outer end edge GT2 and the tangential line SS3 is the longest when measured in the direction L4b.

When viewed along a normal L3 to the front surface 3a of the touchscreen panel 3, the outer end edges GT3 of the fixed electrode 252c are in contact with at least a tangential line SS5 (fifth tangential line) and a tangential line SS6 (sixth tangential line). All of a plurality of tangential lines which extend along the longitudinal axis of the first line electrodes X1 and are in contact with the outer end edges GT3 of the fixed electrode 252c include the tangential line SS5 (fifth tangential line) and the tangential line SS6 (sixth tangential line). The tangential line SS5 and the tangential line SS6 are tangential lines which are parallel to the longitudinal axis of the first line electrode X1c. Specifically, the tangential line SS5 is in contact with one side in the opposite direction L4a (i.e., on the right) (i.e., the right side) of the fixed electrode 252c, while the tangential line SS6 is in contact with another side in the one direction L4b (i.e., on the left) (i.e., the left side) of the fixed electrode 252c. In FIG. 9, the tangential line SS5 and the tangential line SS6 respectively overlap with the entire right side and the entire left side of the fixed electrode 252c. Among a plurality of tangential lines which may be in contact with the outer end edges GT3 of the fixed electrode 252c, the tangential line SS5 is located most distant in the opposite direction L4b from one first line electrode X1c and the tangential line SS6 is located most distant in the one direction L4a from the first line electrode X1c. As used herein, the "first line electrode X1c" may be either the one first line electrode X1a (i.e., one of the two first line electrodes X15, X16) among the one or more first line electrodes X1a or the other first line electrode X1a (i.e., the other of the two first line electrodes X15, X16), whichever is appropriate.

When viewed along a normal L3 to the front surface 3a of the touchscreen panel 3, the outer end edges GT4 of the fixed electrode 252d are in contact with at least a tangential line SS7 (seventh tangential line) and a tangential line SS8 (eighth tangential line). All of a plurality of tangential lines which extend along the longitudinal axis of the first line electrodes X1 and are in contact with the outer end edges GT4 of the fixed electrode 252d include the tangential line SS7 (seventh tangential line) and the tangential line SS8 (eighth tangential line). The tangential line SS7 and the tangential line SS8 are tangential lines which are parallel to the longitudinal axis of the first line electrodes X1. Specifically, the tangential line SS7 is in contact with one side in the opposite direction L4b (i.e., on the right) (i.e., the right side) of the fixed electrode 252d, while the tangential line SS8 is in contact with another side in the one direction L4a (i.e., on the left) (i.e., the left side) of the fixed electrode 252d. In FIG. 9, the tangential line SS7 and the tangential line SS8 respectively overlap with the entire right side and the entire left side of the fixed electrode 252d. Among a plurality of tangential lines which may be in contact with the outer end edges GT4 of the fixed electrode 252d, the tangential line SS7 is located most distant in the opposite direction L4b from one first line electrode X1c and the tangential line SS8 is located most distant in the one direction L4a from the tangential line SS7.

In FIG. 9, the fixed electrode 252d is provided on the right of the fixed electrode 252c. Alternatively, the fixed electrode 252d may be provided on the left of the fixed electrode 252c. In that case, the tangential line SS8 (seventh tangential line) is in contact with one side in the one direction L4a (i.e., on the left; in the first direction) (i.e., the left side) of the fixed electrode (fourth fixed electrode) 252d, while the tangential line SS7 (eighth tangential line) is in contact with another side in the opposite direction L4b (i.e., on the right; in the second direction) (i.e., the right side) of the fixed electrode 252d. Among a plurality of tangential lines which may be in contact with the outer end edges GT4 of the fixed electrode 252d, the tangential line SS8 is located most distant in the one direction L4a from one first line electrode X1c and the tangential line SS7 is located most distant in the opposite direction L4b from the tangential line SS8. In this case, the "first line electrode X1c" may also be either the one first fixed line electrode X1a (i.e., one of the two first line electrodes X15, X16) among the one or more first line electrodes X1a or the other first line electrode X1a (i.e., the other of the two first fixed line electrodes X15, X16), whichever is appropriate.

The fixed electrode 252a includes the shifted portion P1 which is shifted, with respect to the fixed electrode 252b, by a predetermined distance R11 in the particular direction L4 perpendicular to both the direction aligned with the longitudinal axis of the first line electrodes X1 and the rotational axis L3. The predetermined distance R11 is the distance between the tangential lines SS2 and SS4. In addition, the fixed electrode 252b includes the shifted portion P2 which is shifted, with respect to the fixed electrode 252a, by a predetermined distance R12 in the particular direction L4. The predetermined distance R12 is the distance between the tangential lines SS1 and SS3. Furthermore, the fixed electrode 252c includes the shifted portion P3 which is shifted, with respect to the fixed electrode 252d, by a predetermined distance R21 in the particular direction L4. The predetermined distance R21 is the distance between the tangential lines SS6 and S SS8. Furthermore, the fixed electrode 252d includes the shifted portion P4 which is shifted, with respect to the fixed electrode 252c, by a predetermined distance R22 in the particular direction L4. The predetermined distance R22 is the distance between the tangential lines SS5 and SS7. Arranging the respective fixed electrodes 252a-252d in this manner enables accurately detecting a rotary operation performed on the input device 2.

In this embodiment, one fixed electrode 252b in the one pair of fixed electrodes 252a, 252b and one fixed electrode 252c in the other pair of fixed electrodes 252c, 252d, for example, do not overlap with the same first line electrode X1 when viewed along the rotational axis L3 of the rotary click cam 23. In this embodiment, the fixed electrode 252b is located closer to one end along the longitudinal axis of the second line electrodes Y1 (e.g., closer to the left end on the paper on which FIG. 9 is drawn (i.e., closer to the upstream end in the scanning direction when the first line electrodes X1 are scanned)) than the fixed electrode 252c is.

Then, a rotary operation is performed on the input device 2. That is to say, the rotary click cam 23 is subjected to a rotary operation. This brings the respective contactors 61a, 61b of the one pair of brushes 253a, 253b into contact with conductive areas 242a and insulating areas 242b of the rotary contact plate 24 alternately, thus making the contactors 61a, 61b electrically conductive and non-conductive with each other alternately. Consequently, as a result of the rotary operation (operation) performed on the rotary click cam 23, the one pair of fixed electrodes 252a, 252b become electrically conductive and non-conductive with each other alternately. In the same way, the respective contactors 61c, 61d of the other pair of brushes 253c, 253d also come into contact with conductive areas 242a and insulating areas 242b of the rotary contact plate 24 alternately, thus making the contactors 61c, 61d of the other pair of brushes 253c, 253d electrically conductive and non-conductive with each other alternately. Consequently, as a result of the rotary operation (operation) performed on the rotary click cam 23, the other pair of fixed electrodes 252c, 252d become electrically conductive and non-conductive with each other alternately.

Then, the point of touch detection function allows the touchscreen panel 3 to sequentially detect the respective locations (i.e., the locations on the display screen 4a) of the pair of fixed electrodes that have become electrically conductive with each other. More specifically, suppose a situation where with the one pair of fixed electrodes 252a, 252b become electrically conductive with each other, a scan voltage is selectively applied to a first line electrode X12 out of the plurality of first line electrodes X1. In that case, all of the other first line electrodes X1, but the first line electrode X1 selected, out of the plurality of first line electrodes X1 are connected to a reference potential (i.e., the ground potential).

In this connection state, one fixed electrode 252b in the one pair of fixed electrodes 252a, 252b is capacitively coupled to a part (i.e., a broader portion 80) of the first line electrode X12 selected. The other fixed electrode 252a is capacitively coupled to a part (i.e., a broader portion 80) of the first line electrode X15, X16 that is connected to the reference potential. This causes electrostatic charges to be drained from the one fixed electrode 252b via the other fixed electrode 252a and the first line electrode X15, X16, thus discharging the fixed electrode 252b to the reference potential. As a result, the electrostatic capacitance between a part of the first line electrode X12 and the one fixed electrode 252b varies (decreases). This decrease is detected by the detection circuit 315 of the touchscreen panel 3 based on an output value obtained from the second line electrode Y17, Y18 overlapping with the one fixed electrode 252b. Then, based on the arrangement location of the second line electrode Y17, Y18 and the arrangement location of the first line electrode X12 selected, the location of a part, overlapping with the first line electrode X12, of the one fixed electrode 252b (i.e., the location on the front surface 3a of the touchscreen panel 3) is detected by the detection circuit 315 of the touchscreen panel 3.

Then, with the one pair of fixed electrodes 252a, 252b become electrically conductive with each other, the first line electrode X1, to which the scan voltage is applied, out of the plurality of first line electrodes X1, is scanned one after another, thus detecting the respective locations of the one pair of fixed electrodes 252a, 252b. Thereafter, when the other pair of fixed electrodes 252c, 252d become electrically conductive with each other, the detection circuit of the touchscreen panel 3 detects the respective locations of the other pair of fixed electrodes 252c, 252d.

As can be seen, the respective locations of the one pair of fixed electrodes 252a, 252b are detected. After that, the respective locations of the other pair of fixed electrodes 252c, 252d are detected. Then, based on these results of detection, the detection circuit 315 of the touchscreen panel 3 detects a rotary operation (such as a rotational direction) performed on the input device 2. For example, the detection circuit 315 of the touchscreen panel 3 detects the respective locations of the one pair of fixed electrodes 252a, 252b. Then, based on a time lag (phase shift) involved until the respective locations of the other pair of fixed electrodes 252c, 252d are detected, the rotary operation (such as a rotational direction) performed on the input device 2 is detected.

As can be seen from the foregoing description, in the input system 1 according to this embodiment, the fixed electrodes 252a, 252b are provided on the contact board 25 such that the fixed electrode 252a has a shifted portion P1 which is shifted in the particular direction L4 by a predetermined distance R11 with respect to the fixed electrode 252b and that the fixed electrode 252b has a shifted portion P2 which is shifted in the particular direction L4 by a predetermined distance R12 with respect to the fixed electrode 252a. This allows the input device 2 to be placed on the front surface 3a of the touchscreen panel 3 with the orthogonal direction L2 (i.e., a direction perpendicular to both the particular direction L4 and the rotational axis L3) aligned with the longitudinal axis of the first line electrodes X1 of the touchscreen panel 3. That is to say, the input device 2 may be placed on the front surface 3a of the touchscreen panel 3 to prevent the fixed electrodes 252a, 252b from overlapping with the same first line electrode X1. This arrangement enables detecting an operation (e.g., a rotary operation) performed on the input device 2 by using the point of touch detection function of the touchscreen panel 3. In addition, not only the fixed electrodes 252a, 252b but also the fixed electrodes 252c, 252d are provided on the contact board 25, thus enabling accurately detecting an operation performed on the rotary click cam 23.

Note that the input device 2 according to this embodiment allows, when placed at an arbitrary location on the front surface 3a of a touchscreen panel 3 with a general configuration, the pair of fixed electrodes 252a, 252b to be arranged to avoid overlapping with the same first line electrode X1. On the other hand, the input device that has been described in the background section cannot allow, no matter where on the front surface 3a of the touchscreen panel 3 with the general configuration the input device is placed, the pair of fixed electrodes to be arranged to avoid overlapping with the same first line electrode X1, because its fixed electrodes have a different shape and arrangement from their counterparts of the input device 2. Thus, the input device that has been described in the background section cannot enable, no matter where on the front surface 3a of the touchscreen panel 3 with the general configuration the input device is placed, detecting a rotary operation performed on the input device by using the point of touch detection function of the touchscreen panel 3.

In addition, the input device 2 is placed on the front surface 3a of the touchscreen panel 3 with the orthogonal direction L2 aligned with the longitudinal axis of the first line electrodes X1 of the touchscreen panel 3. This allows the input device 2 to be provided at any arbitrary location on the front surface 3a of the touchscreen panel 3.

Furthermore, the electrical charges in each of the fixed electrodes 252a-252d are drained from a fixed electrode paired with the fixed electrode, out of the fixed electrodes 252a-252d, via a first line electrode X1 connected to a reference location on the touchscreen panel 3. That is to say, the electrical charges in the fixed electrodes 252a-252d are drained via the touchscreen panel 3, not manually by the operator's hand. This allows the operator to perform a rotary operation on the input device 2 with gloved hands.

(Variations)
(First Variation)

In the exemplary embodiment described above, the orthogonal direction L2 is supposed to be a linear direction. Alternatively, the orthogonal direction L2 may also be a curved direction. Specifically, in the exemplary embodiment described above, the longitudinal axis of the first line electrodes X1 of the touchscreen panel 3 is a linear axis. Meanwhile, suppose a situation where the plurality of first line electrodes X1 are arranged concentrically around a point and the plurality of second line electrodes Y1 are arranged to radially extend from that point. In such a situation, if the orthogonal direction L2 is defined to be a direction aligned with the longitudinal axis of the first line electrodes X1, then the orthogonal direction L2 will be curved along the first line electrodes X1.

(Second Variation)

The input device 2 according to the exemplary embodiment described above may further has the capability of accepting a push operation. In that case, the rotary click cam 23 (operating member) may be configured to be elastically displaceable downward along the rotational axis L3 thereof. That is to say, the rotary click cam 23 is provided for the contact board 25 so as to be brought closer toward, or away from, the contact board 25. This allows the rotary click cam 23 to accept, when pushed and pressed against the contact board 25, the push operation.

Figure 10:
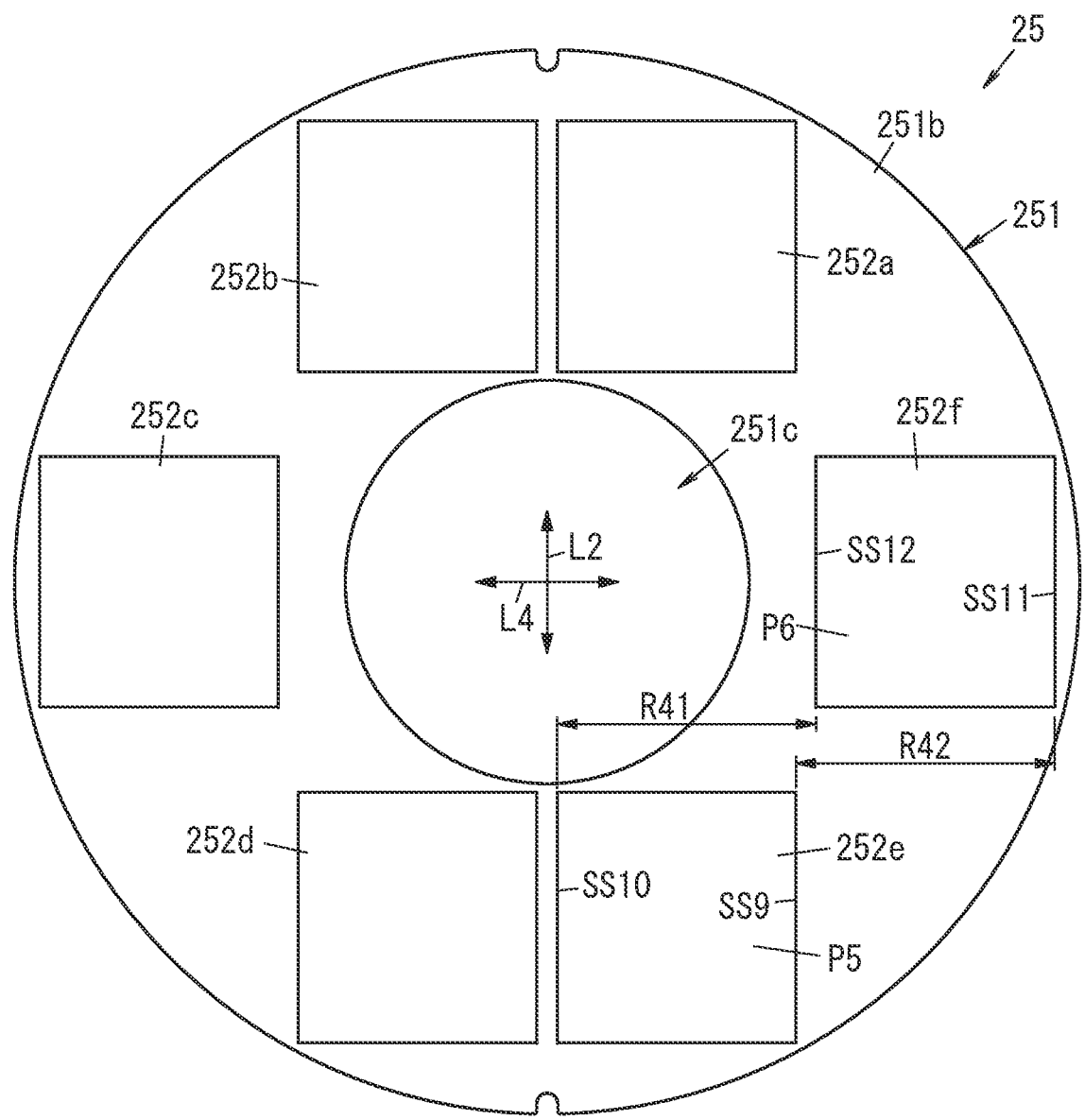
FIG. 10 is a plan view of a contact board of an input device according to a second variation as viewed from under the lower surface thereof.

In addition, an additional pair of fixed electrodes (namely, a fixed electrode 252e (first fixed electrode) and a fixed electrode 252f (second fixed electrode)) for accepting the push operation is also provided on the lower surface 251b of the contact board 25 (see FIG. 10). This additional pair of fixed electrodes 252e, 252f, as well as the other pairs of fixed electrodes 252a-252d, are provided so as to avoid overlapping with each other in the orthogonal direction L2. In other words, the fixed electrode 252e is provided to include a shifted portion P5 which is shifted in the particular direction L4 by a predetermined distance R41 (first predetermined distance) with respect to the fixed electrode 252f, while the fixed electrode 252f is provided to include a shifted portion P6 which is shifted in the particular direction L4 by a predetermined distance R42 (second predetermined distance) with respect to the fixed electrode 252e. The predetermined distance R41 is the distance between the tangential lines SS10 and SS12. The predetermined distance R42 is the distance between the tangential lines SS9 and SS11. The tangential lines SS9, SS10 respectively correspond to the tangential lines SS1, SS2 of the fixed electrode 252a. The tangential lines SS11, SS12 respectively correspond to the tangential lines SS3, SS4 of the fixed electrode 252b. Each of the predetermined distances R41, R42 may be, for example, equal to or greater than the width of each of the fixed electrodes 252e, 252f as measured in the particular direction L4.

In addition, the additional pair of fixed electrodes 252e, 252f are configured to become electrically conductive with each other when the rotary click cam 23 is brought down toward the contact board 25 while being subjected to a push operation and to become electrically non-conductive with each other when the rotary click cam 23 returns to its home position after the push operation has been canceled. That is to say, the fixed electrodes 252e, 252f are switched from electrically conductive state into electrically non-conductive state, and vice versa, as the rotary click cam 23 (operating member) is brought closer toward, and away from, the contact board 25 (base member).

In the example illustrated in FIG. 10, the pair of fixed electrodes 252a, 252b are arranged side by side and adjacent to each other in a direction perpendicular to the orthogonal direction L2 (i.e., in the particular direction L4). The pair of fixed electrodes 252c, 252d are arranged side by side and adjacent to each other in a direction tilted with respect to the orthogonal direction L2. The pair of fixed electrodes 252e, 252f are arranged side by side and adjacent to each other in a direction tilted with respect to the orthogonal direction L2. The pair of fixed electrodes 252d, 252e are arranged side by side and adjacent to each other in a direction perpendicular to the orthogonal direction L2. In addition, the pair of fixed electrodes 252d, 252e are arranged opposite in the orthogonal direction L2 from the fixed electrodes 252a, 252b with the center hole 251c interposed between these two pairs of fixed electrodes. The fixed electrode 252c is arranged opposite in a direction perpendicular to the orthogonal direction L2 from the fixed electrode 252f with the center hole 251c interposed between these two fixed electrodes 252c, 252f.

Figure 11:
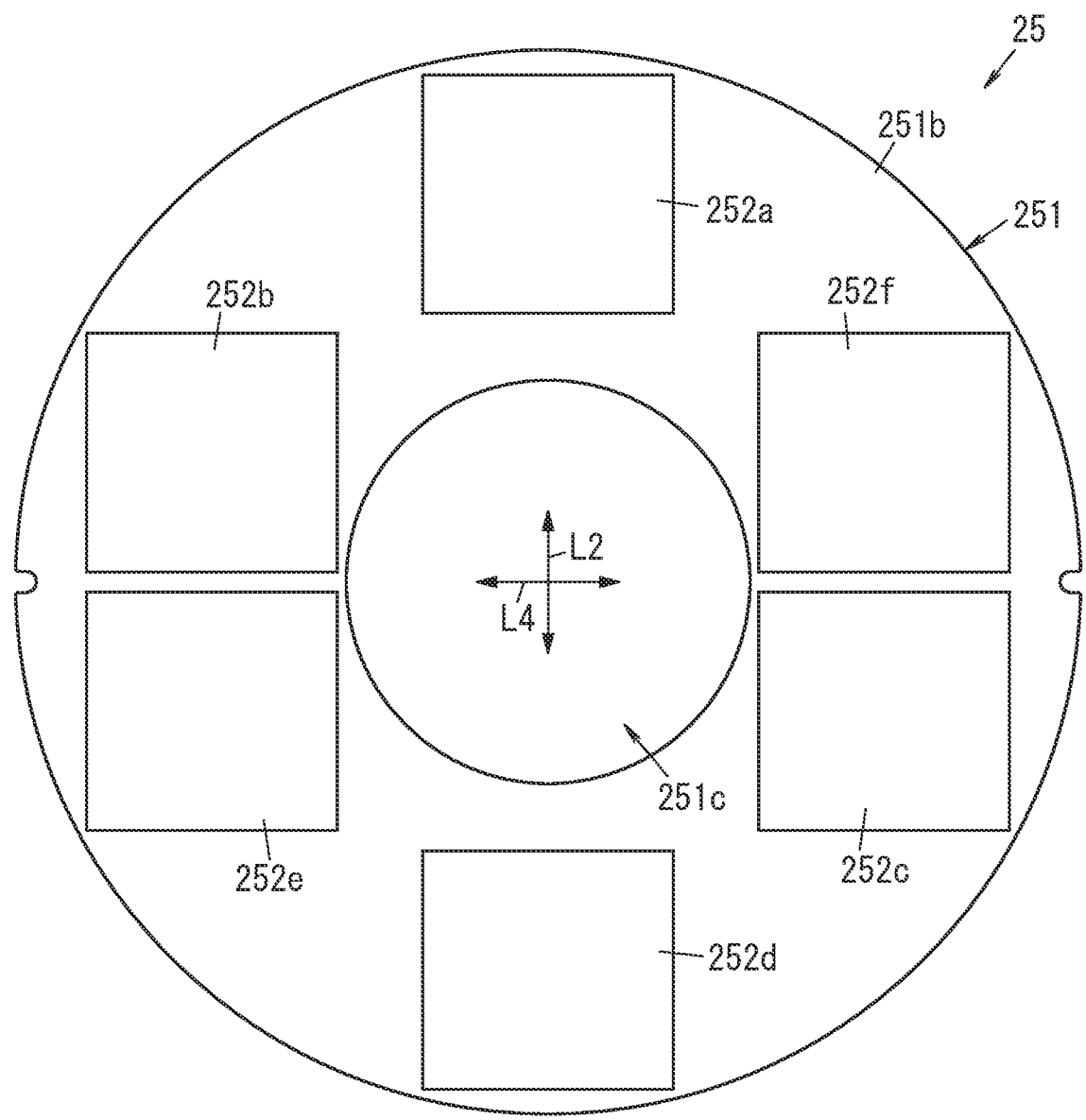
FIG. 11 is a plan view of a contact board of an input device according to a variation of the second variation as viewed from under the lower surface thereof.

Alternatively, the fixed electrodes 252a-252f may also be arranged as shown in FIG. 11 instead of being arranged as shown in FIG. 10. In the example illustrated in FIG. 11, the fixed electrodes 252a, 252b are arranged side by side and adjacent to each other in a direction tilted with respect to the orthogonal direction L2. The fixed electrodes 252c, 252d are also arranged side by side and adjacent to each other in a direction tilted with respect to the orthogonal direction L2. The fixed electrodes 252e, 252f are arranged to interpose the center hole 251c between themselves in a direction tilted with respect to the orthogonal direction L2. The fixed electrodes 252b, 252e are arranged side by side and adjacent to each other in the orthogonal direction L2. The fixed electrodes 252f, 252c are also arranged side by side and adjacent to each other in the orthogonal direction L2. The fixed electrodes 252f, 252c are arranged opposite in the direction perpendicular to the orthogonal direction L2 from the fixed electrodes 252b, 252e with the center hole 251c interposed between these two pairs of fixed electrodes. The fixed electrode 252d is arranged opposite in the orthogonal direction L2 from the fixed electrode 252a with the center hole 251c interposed between these two fixed electrodes 252d, 252a.

In this variation, the rotary click cam 23 is supposed to accept both the rotary operation and push operation to enter a command via this input device 2. However, this is only an example and should not be construed as limiting. Alternatively, the rotary click cam 23 may also be configured to accept only the push operation, out of the rotary and push operations, to enter a command through the input device 2.

(Third Variation)

The arrangement and shapes of the fixed electrodes 252a-252d according to the first embodiment do not have to be the ones shown in FIG. 7 but may also be the ones shown in any of FIGS. 12-17.

Figure 12:
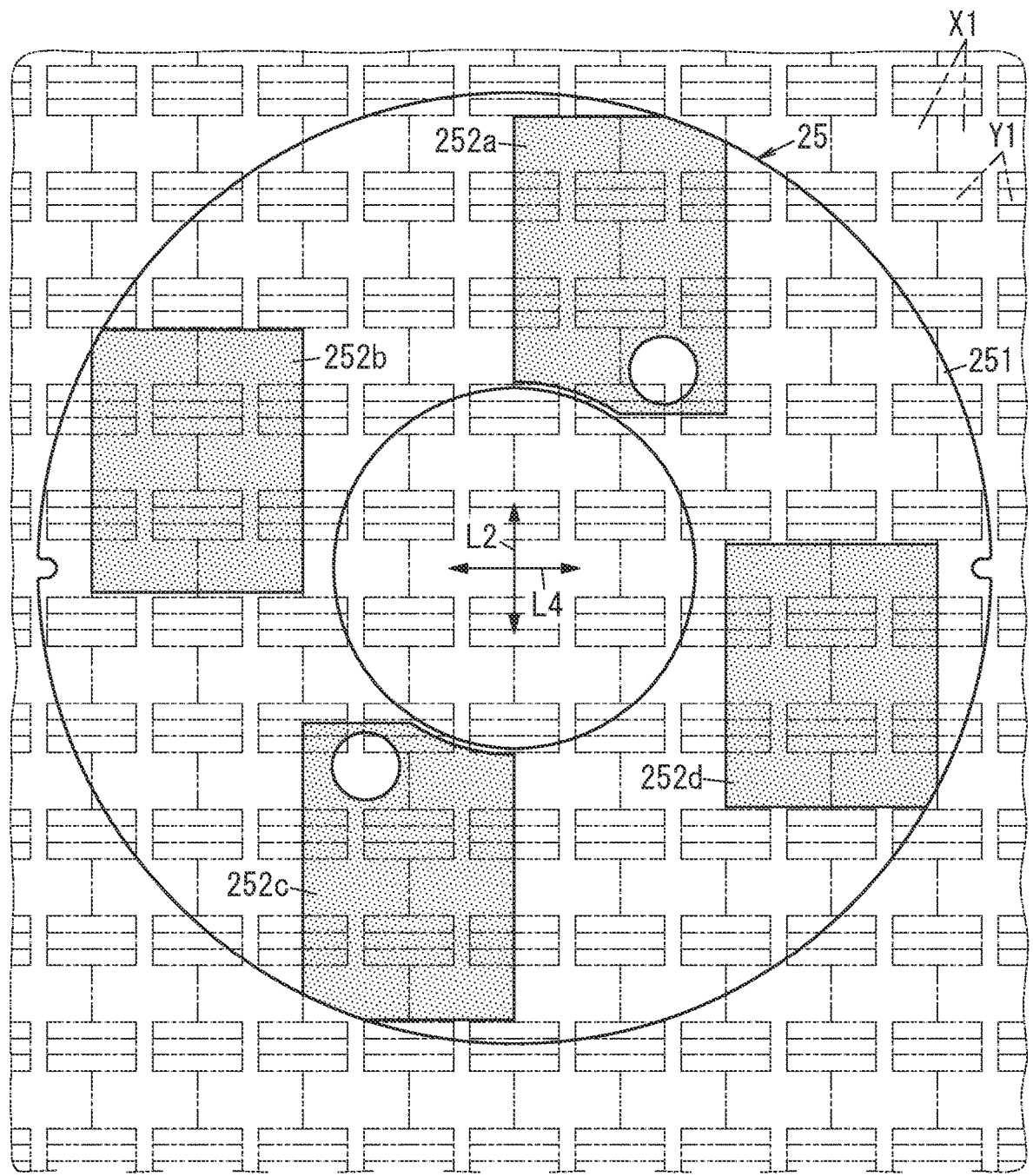
FIG. 12 is a plan view illustrating the arrangement and shape of fixed electrodes in an input device according to a third variation.

Specifically, in the example illustrated in FIG. 12, fixed electrode 252a, 252c are arranged to be shifted from each other in the particular direction L4 that is perpendicular to the orthogonal direction L2 so as to avoid overlapping with each other when viewed in the orthogonal direction L2 as opposed to the example illustrated in FIG. 1. The fixed electrodes 252a-252d have the same shape as their counterparts shown in FIG. 9. In the example illustrated in FIG. 12, each of the fixed electrodes 252a-252d may have an area of about 213 mm$^2$, for example.

Figure 13:
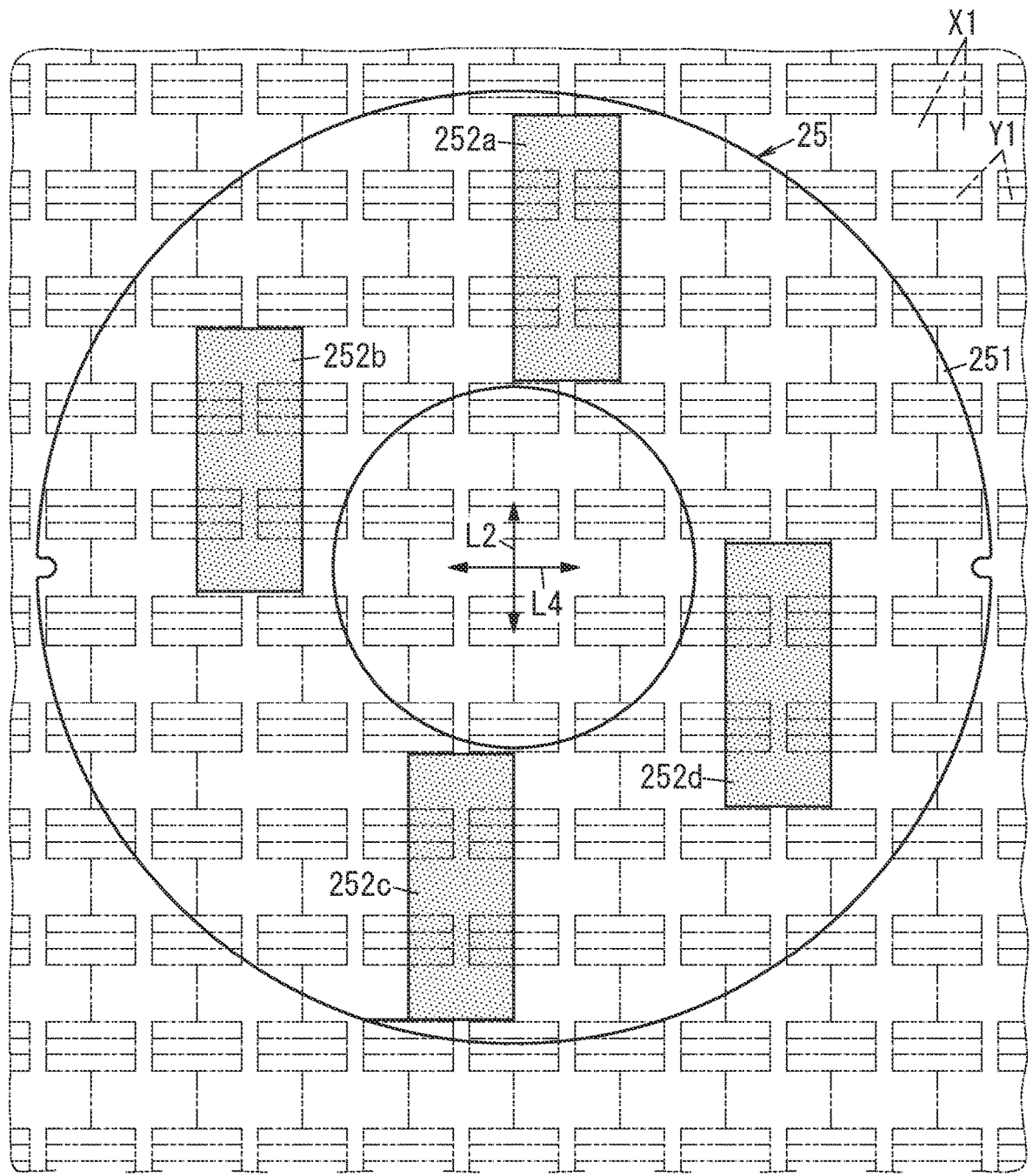
FIG. 13 is a plan view illustrating an alternative arrangement and shape of the fixed electrodes.

In the example illustrated in FIG. 13, the fixed electrodes 252a-252d have a thinner shape than their counterparts shown in FIG. 12. For example, the width of the fixed electrodes 252a-252d (i.e., the width as measured in the particular direction L4 perpendicular to the orthogonal direction L2) shown in FIG. 13 may be a half of the width shown in FIG. 12. In the example illustrated in FIG. 13, each of the fixed electrodes 252a-252d may have an area of about 105 mm$^2$, for example.

Figure 14:
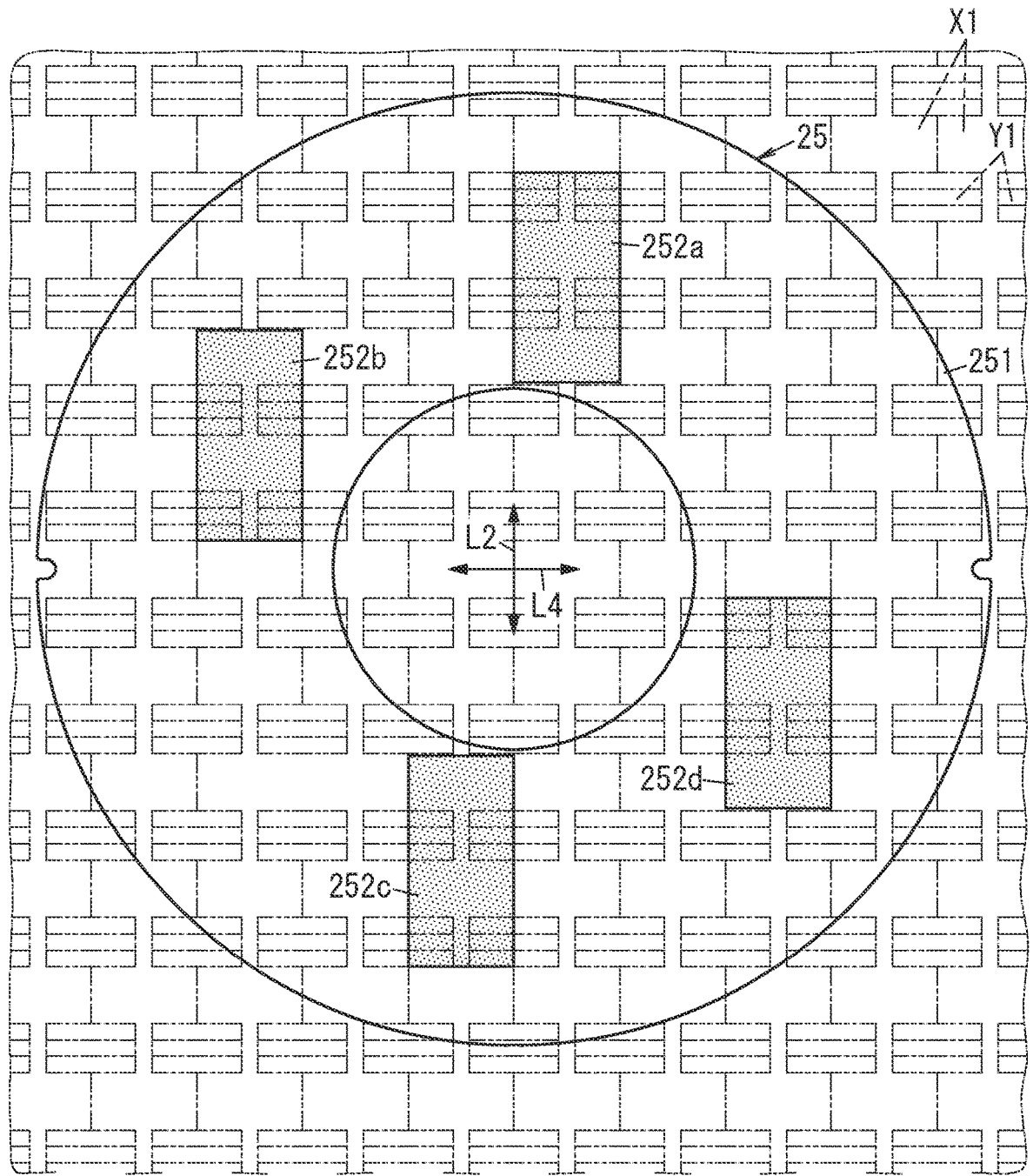
FIG. 14 is a plan view illustrating another alternative arrangement and shape of the fixed electrodes.

In the example illustrated in FIG. 14, the fixed electrodes 252a-252d have a shorter dimension as measured in the orthogonal direction L2 than their counterparts shown in FIG. 13. In the example illustrated in FIG. 14, each of the fixed electrodes 252a-252d may have an area of about 87 mm$^2$, for example.

Figure 15:
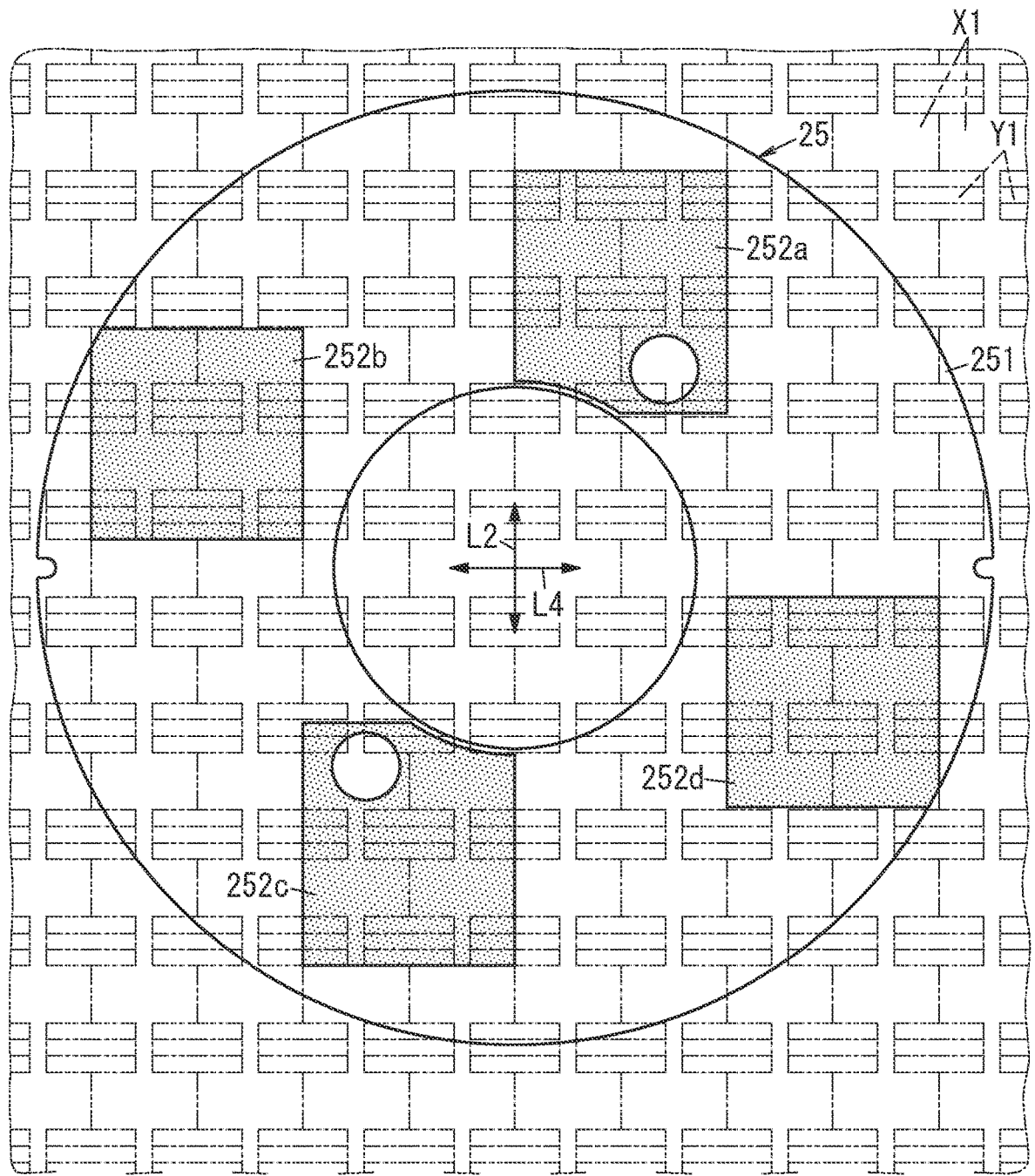
FIG. 15 is a plan view illustrating still another alternative arrangement and shape of the fixed electrodes.

In the example illustrated in FIG. 15, the fixed electrodes 252a-252d have a shorter dimension as measured in the orthogonal direction L2 than their counterparts shown in FIG. 12. Although the fixed electrodes 252a-252d may have a rectangular shape in the example illustrated in FIG. 12, the fixed electrodes 252a-252d have a substantially square shape in the example illustrated in FIG. 15. In the example illustrated in FIG. 15, each of the fixed electrodes 252a-252d may have an area of about 173 mm$^2$, for example.

Figure 16:
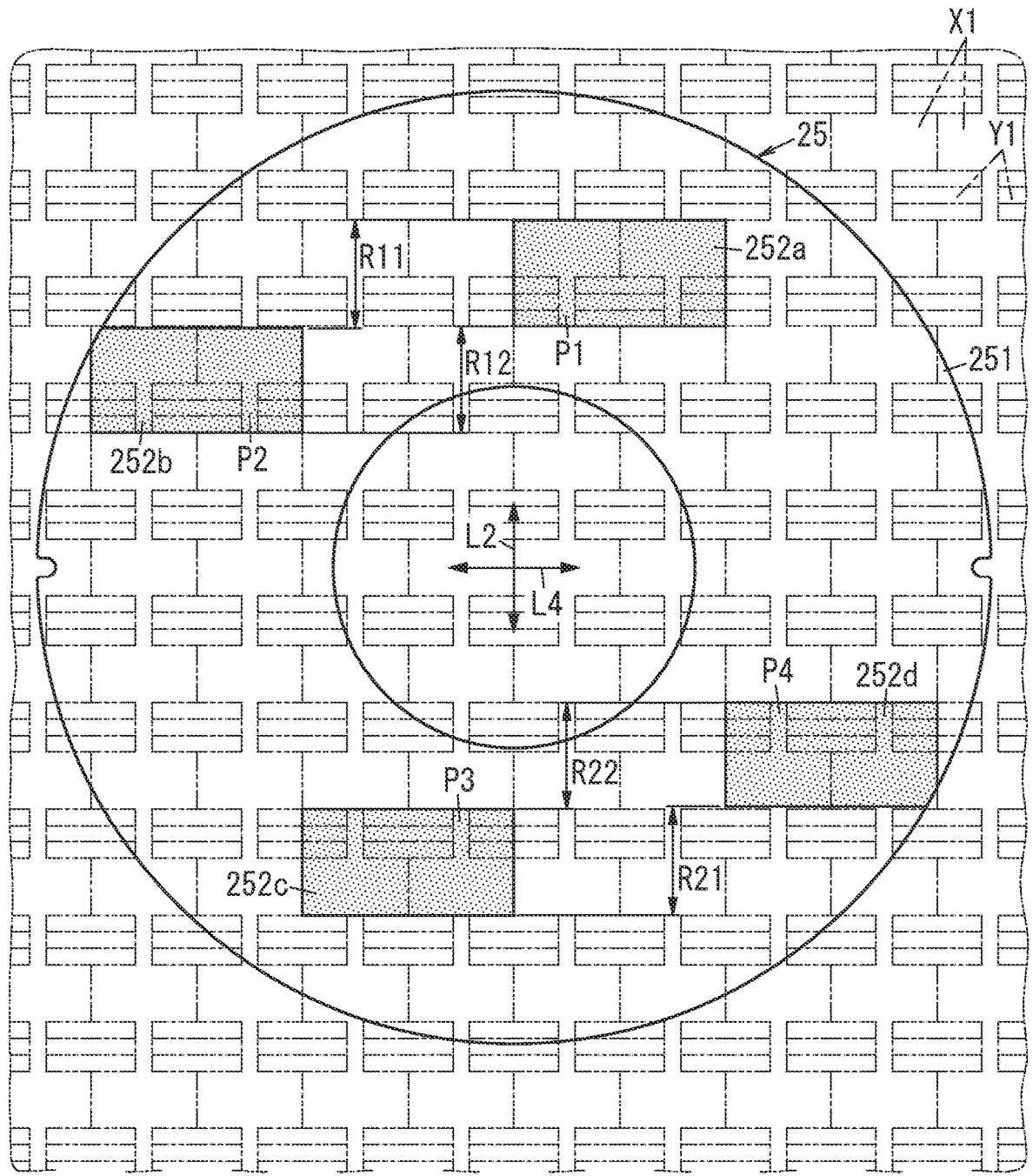
FIG. 16 is a plan view illustrating yet another alternative arrangement and shape of the fixed electrodes.

In the example illustrated in FIG. 16, the fixed electrodes 252a-252d have an even shorter dimension as measured in the orthogonal direction L2 than their counterparts shown in FIG. 15. In the example illustrated in FIG. 16, each of the fixed electrodes 252a-252d has the shape of a rectangle elongated in the particular direction L4 perpendicular to the orthogonal direction L2. In the example illustrated in FIG. 16, the fixed electrodes 252a-252d are arranged on the lower surface 251b of the contact board 25 so as to avoid overlapping with each other when viewed in the particular direction L4 perpendicular to the orthogonal direction L2. In particular, the fixed electrode 252a, 252b do not overlap with each other when viewed in the particular direction L4 perpendicular to the orthogonal direction L2. That is to say, the fixed electrode 252a includes a shifted portion P1 which is shifted in the orthogonal direction L2 by a predetermined distance R11 with respect to the fixed electrode 252b. The fixed electrode 252b includes a shifted portion P2 which is shifted in the orthogonal direction L2 by a predetermined distance R12 with respect to the fixed electrode 252a. Each of the predetermined distances R11, R12 is equal to or greater than the width of the fixed electrode 252a, 252b as measured in the orthogonal direction L2. In addition, the fixed electrode 252c, 252d do not overlap with each other when viewed in the particular direction L4 perpendicular to the orthogonal direction L2. That is to say, the fixed electrode 252c includes a shifted portion P3 which is shifted in the orthogonal direction L2 by a predetermined distance R21 with respect to the fixed electrode 252d. The fixed electrode 252d includes a shifted portion P4 which is shifted in the orthogonal direction L2 by a predetermined distance R22 with respect to the fixed electrode 252c. Each of the predetermined distances R21, R22 is equal to or greater than the width of the fixed electrode 252c, 252d as measured in the orthogonal direction L2. In the example illustrated in FIG. 16, each of the fixed electrodes 252a-252d may have an area of about 87 mm$^2$, for example.

Figure 17:
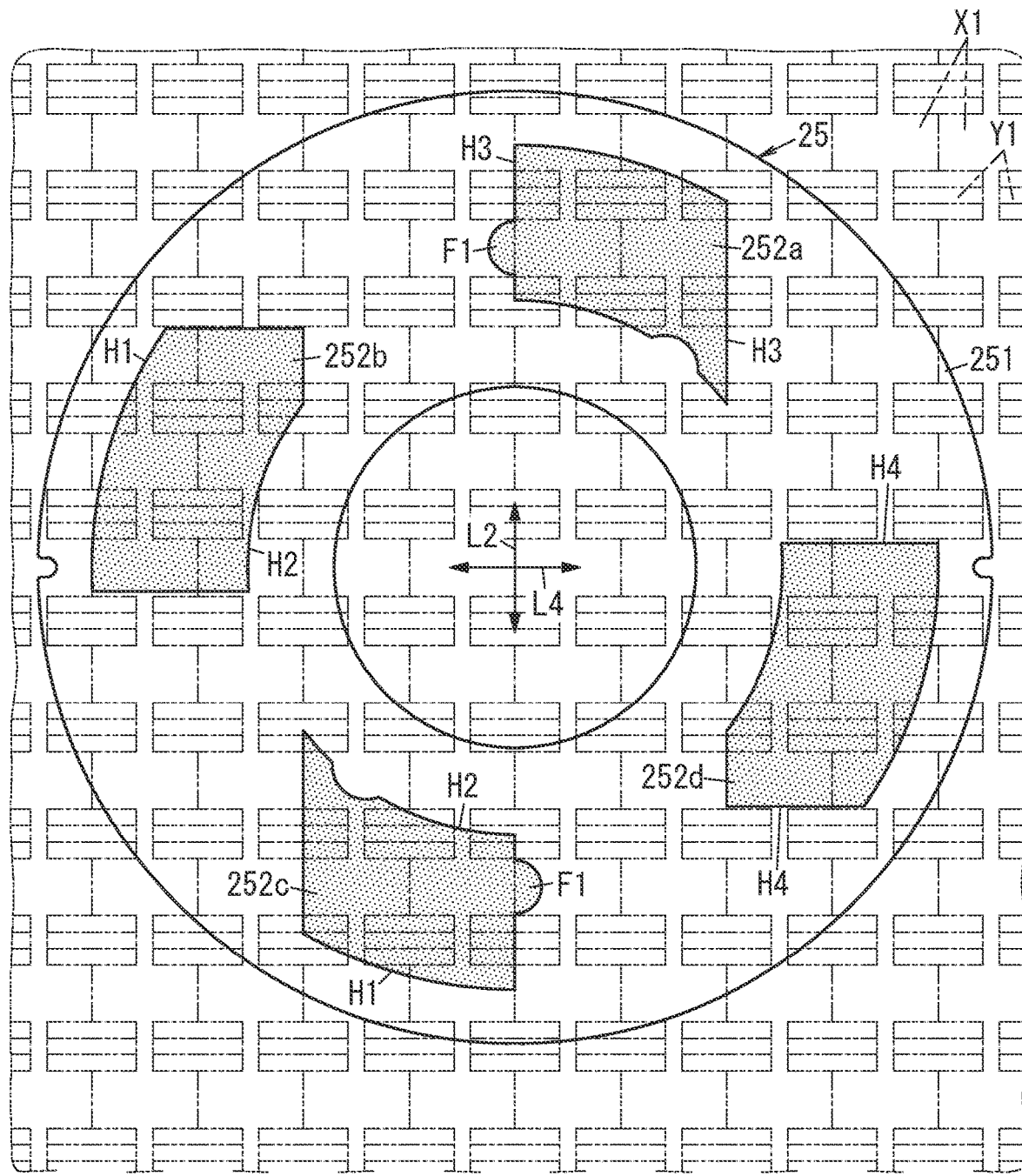
FIG. 17 is a plan view illustrating yet another alternative arrangement and shape of the fixed electrodes.

The example illustrated in FIG. 17 is a variation of the example illustrated in FIG. 12. In the example illustrated in FIG. 17, each of the fixed electrodes 252a-252d is formed in the shape of an arc which is curved along the circumference of the contact board 25. That is to say, the outer lateral side H1 and inner lateral side H2 of each of the fixed electrodes 252a-252d have the shape of an arc. Although the outer lateral side H1 and inner lateral side H2 of each of the fixed electrodes 252a-252d have the shape of an arc, another side H3 thereof parallel to the orthogonal direction L2 and still another side H4 thereof perpendicular to the particular direction L4 are linear. In the example illustrated in FIG. 17, each of the fixed electrodes 252a, 252c may have an area of about 136 mm$^2$, for example, and each of the fixed electrodes 252b, 252d may have an area of about 158 mm$^2$, for example.

Each of the fixed electrodes 252a, 252c has a land F1. The land F1 of the fixed electrode 252a protrudes in the particular direction L4 from one end in the particular direction L4 of the fixed electrode 252a. The land F1 of the fixed electrode 252a is formed to overlap in the orthogonal direction L2 with the fixed electrode 252c. The land F1 of the fixed electrode 252c protrudes in the particular direction L4 from one end in the particular direction L4 of the fixed electrode 252c. The land F1 of the fixed electrode 252c is formed to overlap in the orthogonal direction L2 with the fixed electrode 252a.

In the example illustrated in FIG. 17, each of the fixed electrodes 252a, 252c includes the land F1. However, the fixed electrodes 252a, 252c do not have to include the land F1. The fixed electrodes 252b, 252d may or may not include the land. Likewise, in each of the examples illustrated in FIGS. 12-16, the fixed electrodes 252a-252d may or may not include the land.

(Fourth Variation)

Figure 18:
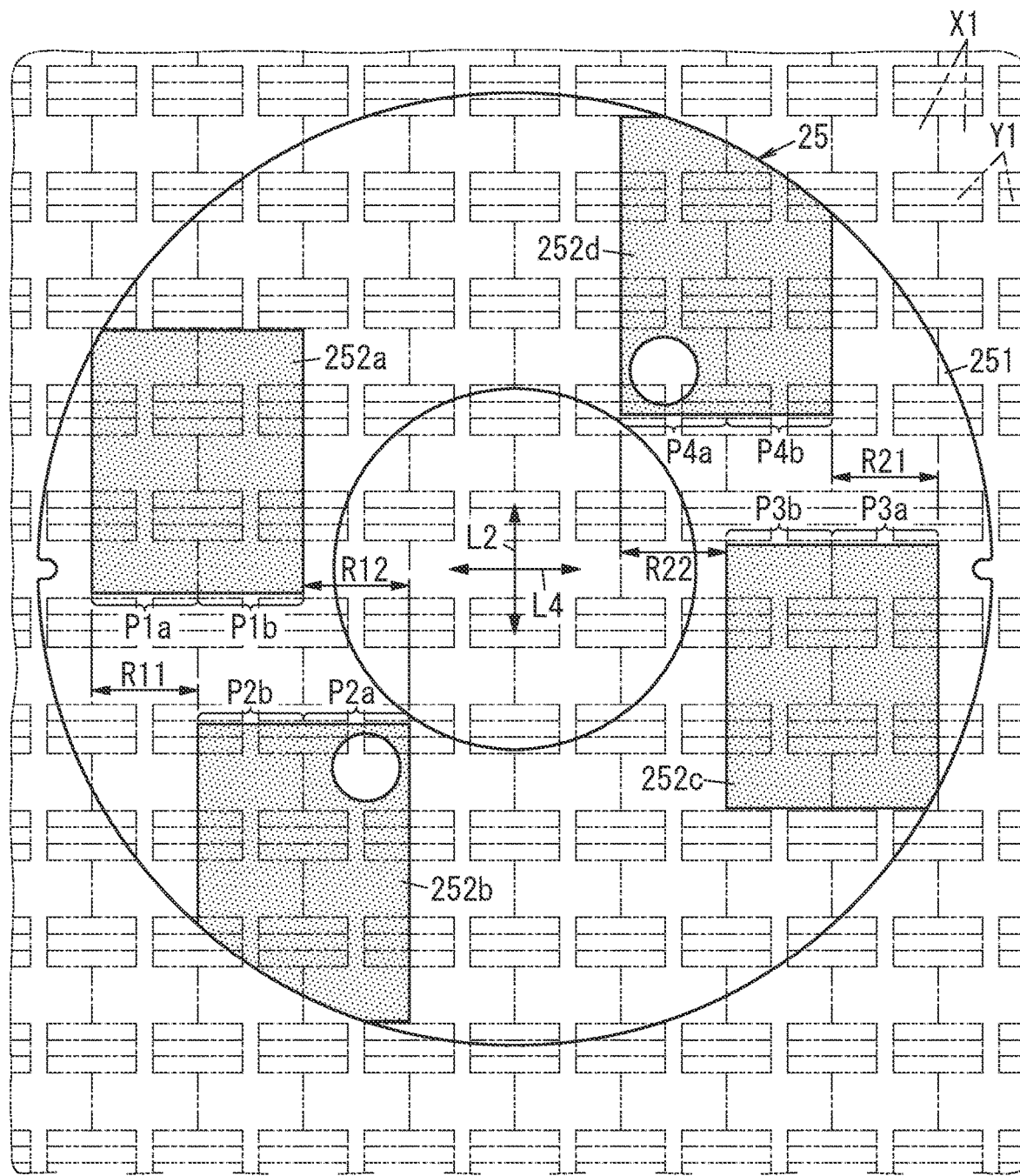
FIG. 18 is a plan view illustrating an arrangement and shape of fixed electrodes in an input device according to a fourth variation.

In a fourth variation, in one pair of fixed electrodes 252a, 252b, the fixed electrode 252a includes both a shifted portion P1a which is shifted in the particular direction L4 by a predetermined distance R11 with respect to the fixed electrode 252b and a non-shifted portion P1b which is not shifted in the particular direction L4 with respect to the fixed electrode 252b as shown in FIG. 18. Likewise, the fixed electrode 252b includes both a shifted portion P2a which is shifted in the particular direction L4 by a predetermined distance R12 with respect to the fixed electrode 252a and a non-shifted portion P2b which is not shifted in the particular direction L4 with respect to the fixed electrode 252a. In the fourth variation, each of the predetermined distances R11, R12 is a half of the width of the fixed electrode 252a, 252b as measured in the particular direction L4. In that case, the width of the shifted portion P1a as measured in the particular direction L4 is a half of the width of the fixed electrode 252a as measured in the particular direction L4. The width of the shifted portion P2a as measured in the particular direction L4 is a half of the width of the fixed electrode 252b as measured in the particular direction L4. In addition, the area of the shifted portion P1a is roughly a half as large as that of the fixed electrode 252a. The area of the shifted portion P2a is roughly a half as large as that of the fixed electrode 252b. Optionally, the area of the shifted portion P1a may be exactly a half as large as that of the fixed electrode 252a. The area of the shifted portion P2a may be exactly a half as large as that of the fixed electrode 252b. In the fourth variation, the fixed electrode 252c is also arranged to include both a shifted portion P3a which is shifted in the particular direction L4 by a predetermined distance R21 with respect to the fixed electrode 252d and a non-shifted portion P3b which is not shifted in the particular direction L4 with respect to the fixed electrode 252d. Likewise, the fixed electrode 252d is also arranged to include both a shifted portion P4a which is shifted in the particular direction L4 by a predetermined distance R22 with respect to the fixed electrode 252c and a non-shifted portion P4b which is not shifted in the particular direction L4 with respect to the fixed electrode 252c. Each of the predetermined distances R21, R22 is a half of the width of the fixed electrode 252c, 252d as measured in the particular direction L4.

In the fourth variation, with the input device 2 placed on the front surface 3a of the touchscreen panel 3, the orthogonal direction L2 is aligned with the longitudinal axis of the first line electrodes X1 of the touchscreen panel 3 as in the exemplary embodiment described above. That is to say, in the direction aligned with the longitudinal axis of the first line electrodes X1, the shifted portions P1a, P2a of the respective fixed electrodes 252a, 252b do not overlap with each other and the non-shifted portions P1b, P2b of the respective fixed electrodes 252a, 252b overlap with each other. Thus, the fixed electrode 252a includes the shifted portion P1*a* which is shifted by the predetermined distance R11, and the non-shifted portion P1*b* which is not shifted, with respect to the fixed electrode 252*b* in the particular direction L4 that is perpendicular to both the longitudinal axis of the first line electrodes X1 and the rotational axis L3.

Furthermore, in the fourth variation, in the one pair of fixed electrodes 252*a*, 252*b*, the shifted portions P1*a*, P2*a* overlap with mutually different first line electrodes X1 and the non-shifted portions P1*b*, P2*b* overlap with the same first line electrode X1 when viewed along the rotational axis L3. This statement about these fixed electrodes 252*a*, 252*b* also applies to the fixed electrodes 252*c*, 252*d*.

In the fourth variation, the fixed electrode 252*a* includes the shifted portion P1*a* which is shifted in the particular direction L4 by the predetermined distance R11 with respect to the fixed electrode 252*b*, while the fixed electrode 252*b* includes the shifted portion P2*a* which is shifted in the particular direction L4 by the predetermined distance R12 with respect to the fixed electrode 252*a*. This allows the input device 2 to be placed on the front surface 3*a* of the touchscreen panel 3 with the orthogonal direction L2 aligned with the longitudinal axis of the first line electrodes X1 of the touchscreen panel 3. That is to say, the input device 2 may be placed on the front surface 3*a* of the touchscreen panel 3 such that the respective shifted portions P1*a*, P2*a* of the fixed electrodes 252*a*, 252*b* overlap with mutually different first line electrodes X1. This arrangement enables detecting a rotary operation performed on the input device 2 by using the point of touch detection function of the touchscreen panel 3 as in the exemplary embodiment described above. Likewise, the fixed electrode 252*c* includes the shifted portion P3*a* which is shifted in the particular direction L4 by the predetermined distance R21 with respect to the fixed electrode 252*d*, while the fixed electrode 252*d* includes the shifted portion P4*a* which is shifted in the particular direction L4 by the predetermined distance R22 with respect to the fixed electrode 252*c*. Thus, as in the case of the fixed electrodes 252*a*, 252*b*, a rotary operation performed on the input device 2 may be detected by using the point of touch detection function of the touchscreen panel 3.

In the fourth variation, the fixed electrodes 252*a*, 252*b* include the non-shifted portions P1*b*, P2*b* which are not shifted from each other in the particular direction L4. In addition, the non-shifted portions P1*b*, P2*b* overlap with the same single first line electrode X1. Nevertheless, since the shifted portions P1*a*, P2*a* thereof overlap with mutually different first line electrodes X1, the rotary operation performed on the input device 2 may also be detected by using the point of touch detection function of the touchscreen panel 3.

Also, in the fourth variation, the non-shifted portions P1*b*, P2*b* overlap with the same single first line electrode X1. Alternatively, the non-shifted portions P1*b*, P2*b* may overlap with the same plurality of first line electrodes X1.

Furthermore, in the fourth variation, the predetermined distances R11, R12, R21, R22 are a half as long as the respective widths of the fixed electrodes 252*a*, 252*b*, 252*c*, 252*d* as measured in the particular direction L4. However, this is only an example and should not be construed as limiting. Rather, the predetermined distances R11, R12, R21, R22 need to be at least one-third as long as the respective widths of the fixed electrodes 252*a*, 252*b*, 252*c*, 252*d* as measured in the particular direction L4.

Furthermore, in the fourth variation, the area of the shifted portion P1*a* is roughly a half as large as the area of the fixed electrode 252*a*, and the area of the shifted portion P2*a* is roughly a half as large as the area of the fixed electrode 252*b*. However, this is only an example and should not be construed as limiting. Rather, the respective areas of the shifted portions P1*a*, P2*a* need to be at least one-third as large as the respective areas of the fixed electrodes 252*a*, 252*b*. Likewise, the respective areas of the shifted portions P3*a*, P4*a* need to be at least one-third as large as the respective areas of the fixed electrodes 252*c*, 252*d*.

Furthermore, in the fourth variation, supposing the pitch between the respective center lines of two adjacent first line electrodes X1, out of the plurality of first line electrodes X1, is one pitch, a half of the width of the fixed electrodes 252*a*, 252*b*, 252*c*, 252*d* as measured in the particular direction L4 is one pitch. Thus, in the fourth variation, the predetermined distances R11, R12, R21, R22 are all one pitch. Nevertheless, the predetermined distances R11, R12, R21, R22 may be at least equal to one pitch. That is to say, the predetermined distances R11, R12, R21, R22 only need to be defined such that at least one first line electrode X1 may overlap with each of the shifted portions P1*a*, P2*a*, P3*a*, P4*a*. In other words, the plurality of first line electrodes X1 are arranged at a predetermined pitch and the predetermined distances (first predetermined intervals) R11, R21 and the predetermined distances (second predetermined intervals) R12, R22 are equal to or greater than the predetermined pitch.

(Fifth Variation)

Figure 19A:
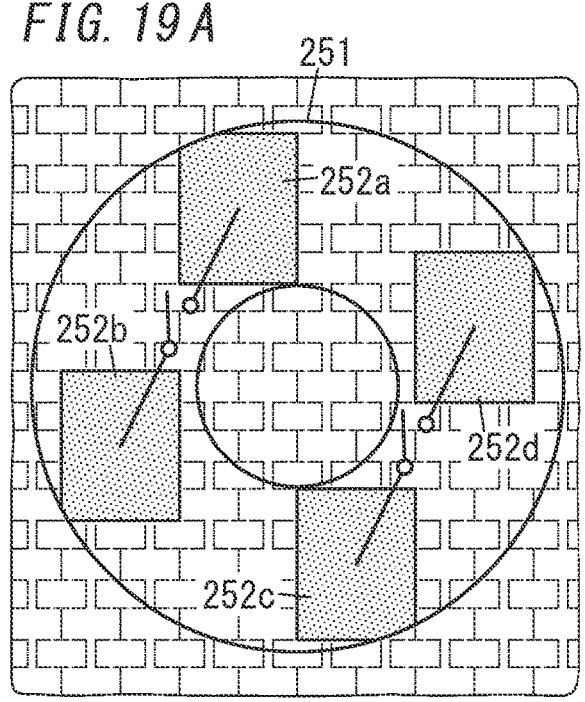
FIGS. 19A-19C are plan views illustrating some variations on pairing fixed electrodes in an input device according to a fifth variation.
Figure 19B:
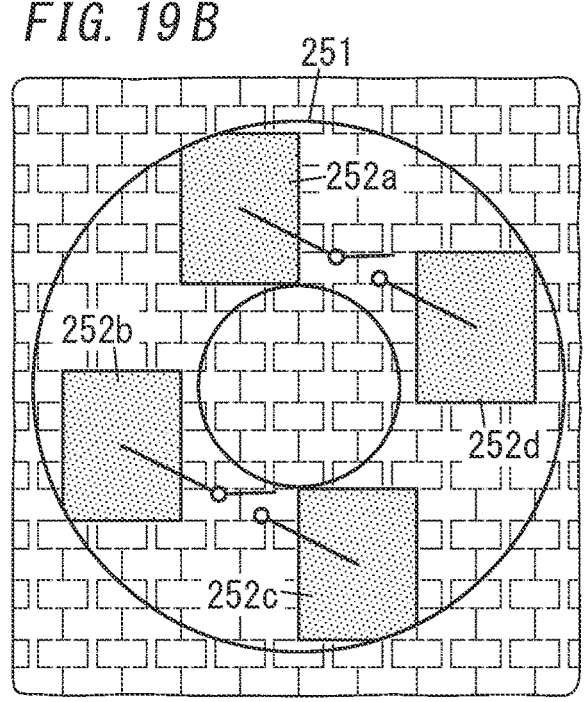
Figure 19C:
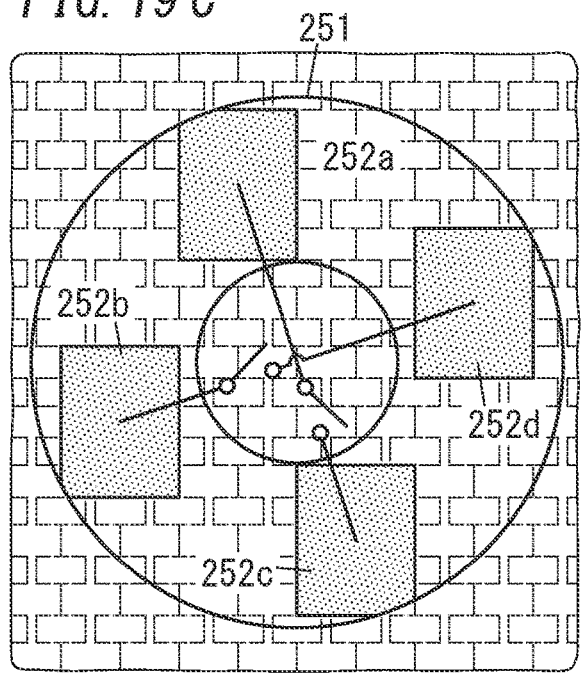

In the exemplary embodiment described above, the fixed electrodes 252*a*, 252*b* are configured to be made electrically conductive or non-conductive with each other by the brushes 253*a*, 253*b*, and the fixed electrodes 252*c*, 252*d* are configured to be made electrically conductive or non-conductive with each other by the brushes 253*c*, 253*d* (see FIG. 19A). However, this is only an example and should not be construed as limiting. Alternatively, the fixed electrodes 252*a*, 252*d* may be made electrically conductive or non-conductive with each other by the brushes 253*a*, 253*d*, and the fixed electrodes 252*b*, 252*c* may be made electrically conductive or non-conductive with each other by the brushes 253*b*, 253*c* (see FIG. 19B). Still alternatively, the fixed electrodes 252*a*, 252*c* may be made electrically conductive or non-conductive with each other by the brushes 253*a*, 253*c*, and the fixed electrodes 252*b*, 252*d* may be made electrically conductive or non-conductive with each other by the brushes 253*b*, 253*d* (see FIG. 19C).

(Sixth Variation)

In the exemplary embodiment described above, the fixed electrodes 252*a*, 252*b* are arranged to be adjacent to each other along the circumference and the fixed electrodes 252*c*, 252*d* are arranged to be adjacent to each other along the circumference. However, this is only an example and should not be construed as limiting. Alternatively, the fixed electrodes 252*a*, 252*c* may be arranged to be adjacent to each other along the circumference and the fixed electrodes 252*b*, 252*d* may be arranged to be adjacent to each other along the circumference.

(Seventh Variation)

Figure 20A:
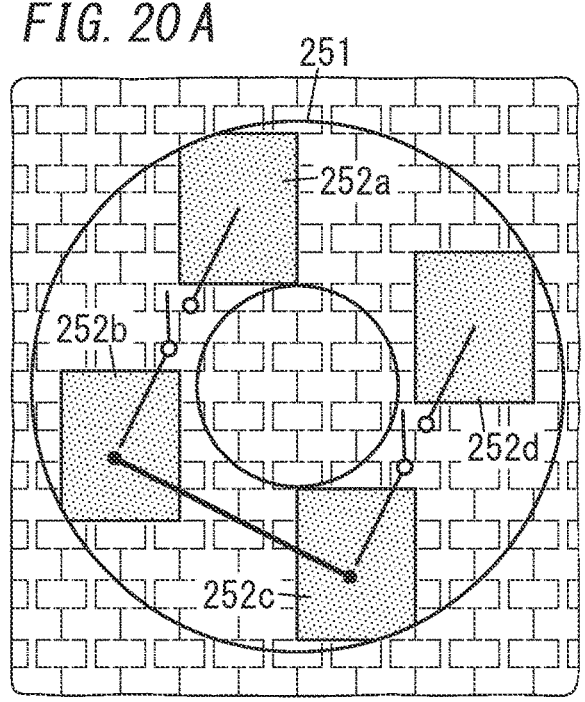
FIGS. 20A-20D are plan views illustrating some variations on pairing fixed electrodes to be electrically connected together in an input device according to a sixth variation.
Figure 20B:
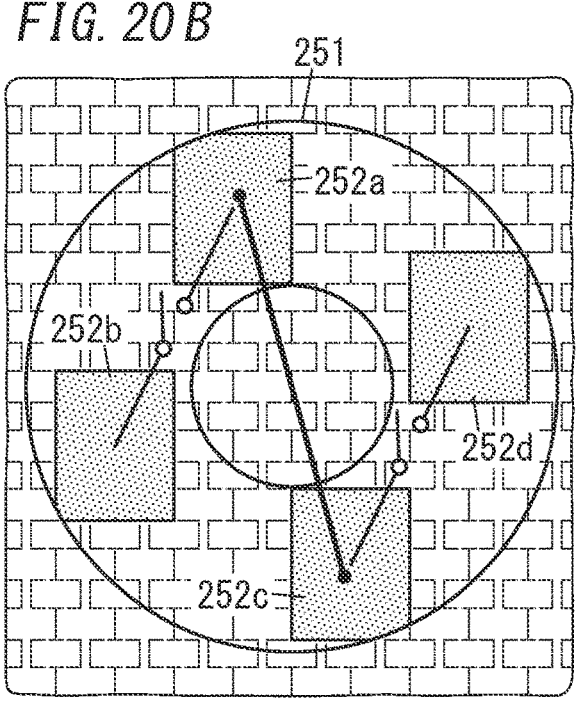
Figure 20C:
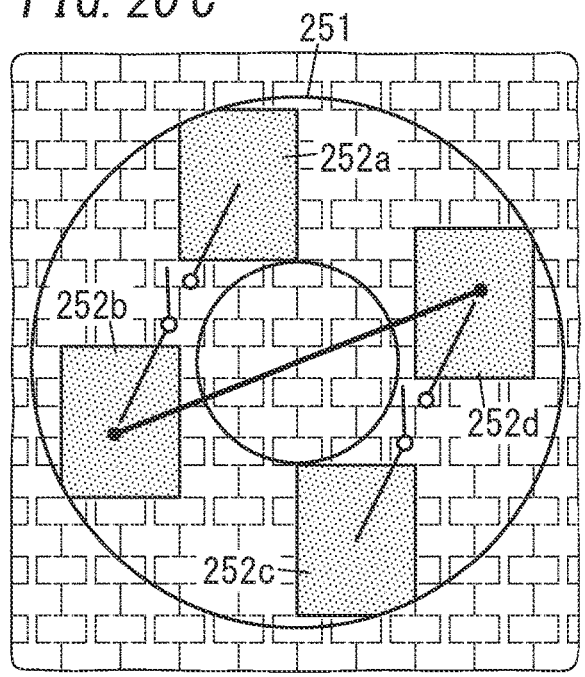
Figure 20D:
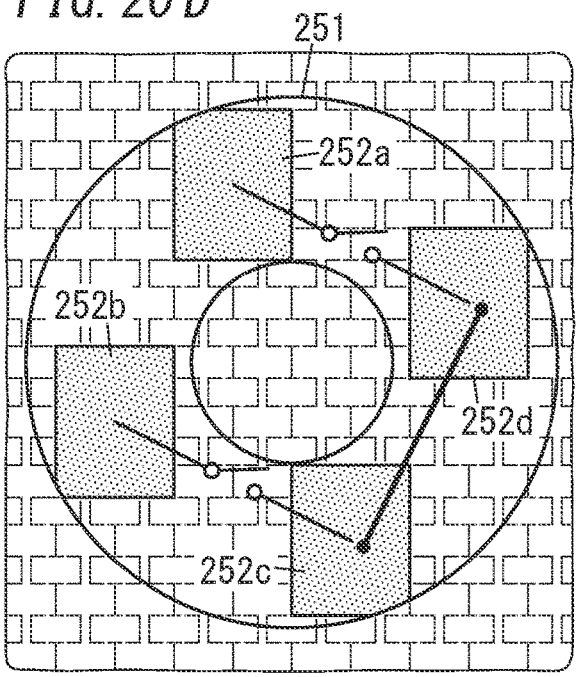

In the exemplary embodiment described above, the fixed electrodes 252*a*, 252*b*, 252*c*, 252*d* are electrically isolated from each other. However, this configuration is only an example and should not be construed as limiting. Alternatively, any two of the fixed electrodes 252*a*, 252*b*, 252*c*, 252*d* may be electrically connected together on the contact board 25. Nevertheless, those two electrically connected electrodes, selected from the fixed electrodes 252*a*, 252*b*, 252*c*, 252*d*, are both connected to the reference potential. In addition, in that case, the two electrically connected electrodes, out of the fixed electrodes 252*a*, 252*b*, 252*c*, 252*d*, may be formed integrally as a single electrode. Specifically, the fixed electrodes 252b, 252c may be electrically connected together (see FIG. 20A). Alternatively, the fixed electrodes 252a, 252c may be electrically connected together (see FIG. 20B). Still alternatively, the fixed electrodes 252b, 252d may be electrically connected together (see FIG. 20C). Yet alternatively, the fixed electrodes 252c, 252d may be electrically connected together (see FIG. 20D). In the last case (i.e., in the case shown in FIG. 20D), the fixed electrodes 252a, 252d are made electrically conductive and non-conductive with each other by the brushes 253a, 253d, and the fixed electrodes 252b, 252c are made electrically conductive and non-conductive with each other by the brushes 253b, 253c.

(Recapitulation)

An input device (2) according to a first aspect includes a base member (25), an operating member (23), one or more first fixed electrodes (252a), and a second fixed electrode (252b). The base member (25) is placed on a front surface (3a) of a touchscreen panel (3). The operating member (23) is provided rotatably around a rotational axis (L3) with respect to the base member (25). The first fixed electrode (252a) and the second fixed electrode (252b) are arranged on a principal surface (251b) of the base member (25). The first fixed electrode (252a) and the second fixed electrode (252b) are configured to, as the operating member (23) is operated, be switched from an electrically conductive state into an electrically non-conductive state, or vice versa. The touchscreen panel (3) includes one or more first line electrodes (X1a) and a plurality of second line electrodes (Y1). The one or more first line electrodes (X1a) have a portion overlapping with the first fixed electrode (252a) when viewed along a normal to the front surface (3a) of the touchscreen panel (3). The one or more first line electrodes (X1a) extend along a longitudinal axis thereof. The plurality of second line electrodes (Y1) intersects with the one or more first line electrodes (X1a) when viewed along the normal to the front surface (3a) of the touchscreen panel (3). All of a plurality of tangential lines extending along the longitudinal axis of the one or more first line electrodes (X1a) and being in contact with outer end edges (GT1) of the first fixed electrode (252a) when viewed along the normal to the front surface (3a) of the touchscreen panel (3) include a first tangential line (SS1) and a second tangential line (SS2) The first tangential line (SS1) is located more distant, in a first direction (L4a), from a particular first line electrode (X1a) out of the one or more first line electrodes (X1a) than any other one of the plurality of tangential lines (SS1, SS2). The second tangential line (SS2) is located more distant, in a second direction (L4b) opposite from the first direction (L4a), from the particular first line electrode (X1a) than any other one of the plurality of tangential lines (SS1, SS2). The first direction (L4a) intersects with the longitudinal axis of the first line electrode (X1a). All of a plurality of tangential lines extending along the longitudinal axis of the one or more first line electrodes (X1a) and being in contact with outer end edges (GT2) of the second fixed electrode (252b) when viewed along the normal to the front surface (3a) of the touchscreen panel (3) include a third tangential line (SS3) and a fourth tangential line (SS4). The third tangential line (SS3) is located more distant, in the first direction (L4a), from the particular first line electrode (X1a) than any other one of the plurality of tangential lines (SS3, SS4). The fourth tangential line (SS4) is located more distant, in the second direction (L4b), from the third tangential line (SS3) than any other one of the plurality of tangential lines (SS3, SS4). The first fixed electrode (252a) includes a first shifted portion (P1) shifted by a first predetermined distance (R11) between the second tangential line (SS2) and the fourth tangential line (SS4) with respect to the second fixed electrode (252b). The second fixed electrode (252b) includes a second shifted portion (P2) shifted by a second predetermined distance (R12) between the first tangential line (SS1) and the third tangential line (SS3) with respect to the first fixed electrode (252a).

According to this configuration, when viewed along a normal to the front surface (3a) of the touchscreen panel (3), the outer end edges (GT1) of the first fixed electrode (252a) are in contact with at least the first tangential line (SS1) and the second tangential line (SS2) which are parallel to the longitudinal axis of the first line electrode (X1a). Among a plurality of tangential lines which may be in contact with the outer end edges (GT1) of the first fixed electrode (252a), the first tangential line (SS1) is located most distant in the first direction (L4a) from the first line electrode (X1a) and the second tangential line (SS2) is located most distant in the second direction (L4b) from the first line electrode (X1a). In addition, when viewed along the normal to the front surface (3a) of the touchscreen panel (3), the outer end edges (GT2) of the second fixed electrode (252b) are in contact with at least the third tangential line (SS3) and the fourth tangential line (SS4) which are parallel to the longitudinal axis of the first line electrode (X1a). Among a plurality of tangential lines which may be in contact with the outer end edges (GT2) of the second fixed electrode (252b), the third tangential line (SS3) is located most distant in the first direction (L4a) from the first line electrode (X1a) and the fourth tangential line (SS4) is located most distant in the second direction (L4b) from the third tangential line (SS3). With respect to such first through fourth tangential lines (SS1-SS4), the first fixed electrode (252a) includes a first shifted portion (P1) shifted by a first predetermined distance (R11) between the second tangential line (SS2) and the fourth tangential line (SS4) with respect to the second fixed electrode (252b), and the second fixed electrode (252b) includes a second shifted portion (P2) shifted by a second predetermined distance (R12) between the first tangential line (SS1) and the third tangential line (SS3) with respect to the first fixed electrode (252a). That is to say, placing such an input device (2) on the front surface (3a) of the touchscreen panel (3) allows the input device (2) to be provided at any location on the front surface (3a) of the touchscreen panel (3) and also allows the touchscreen panel (3) to detect an operation performed on the input device (2).

An input device (2) according to a second aspect, which may be implemented in conjunction with the first aspect, further includes a moving electrode (242) provided for the operating member (23). The moving electrode (242) switches, as the operating member (23) is turned, the first fixed electrode (252a) and the second fixed electrode (252b) from the electrically conductive state into the electrically non-conductive state, or vice versa.

This configuration allows the operator to perform a rotary operation on the input device (2) to enter a command via the operating member (23).

In an input device (2) according to a third aspect, which may be implemented in conjunction with the first aspect, the operating member (23) is provided to be bought closer toward, or away from, the base member (25). The first fixed electrode (252a) and the second fixed electrode (252b) are made electrically conductive or non-conductive with each other as the operating member (23) is brought closer toward, or away from, the base member (25).

This configuration allows the operator to perform a push operation on the input device (2) to enter a command via the operating member (23).

In an input device (2) according to a fourth aspect, which may be implemented in conjunction with any one of the first to third aspects, the first shifted portion (P1a) of the first fixed electrode (252a) has an area at least one-third as large as an area of the first fixed electrode (252a). The second shifted portion (P2a) of the second fixed electrode (252b) has an area at least one-third as large as an area of the second fixed electrode (252b).

This configuration allows, even if the first fixed electrode (252a) and the second fixed electrode (252b) include non-shifted portions (P1b, P2b) which are not shifted in either the first direction (L4a) or the second direction (L4b), the input device (2) to be provided at any location on the front surface (3a) of the touchscreen panel (3) and also allows the touchscreen panel (3) to detect an operation performed on the input device (2).

In an input device (2) according to a fifth aspect, which may be implemented in conjunction with any one of the first to third aspects, the first shifted portion (P1) of the first fixed electrode (252a) has the same area as the first fixed electrode (252a), and the second shifted portion (P2) of the second fixed electrode (252b) has the same area as the second fixed electrode (252b).

According to this configuration, the first fixed electrode (252a) and the second fixed electrode (252b) include only the shifted portions (P1, P2) out of the shifted portions (P1, P2) which are shifted in either the first direction (L4a) or the second direction (L4b) and the non-shifted portions which are not shifted in the first direction (L4a) or the second direction (L4b). This allows the touchscreen panel (3) to accurately detect the rotary operation performed on the input device (2).

An input device (2) according to a sixth aspect, which may be implemented in conjunction with any one of the first to fifth aspects, further includes a third fixed electrode (252c) and a fourth fixed electrode (252d), both of which are provided on the principal surface (251b) of the base member (25). All of a plurality of tangential lines extending along the longitudinal axis of the one or more first line electrodes (X1) and being in contact with outer end edges (GT3) of the third fixed electrode (252c) when viewed along the normal to the front surface (3a) of the touchscreen panel (3) include a fifth tangential line (SS6) and a sixth tangential line (SS5). The fifth tangential line (SS6) is located more distant, in the first direction (L4a), from a second particular first line electrode (X1a) out of the one or more first line electrodes (X1a) than any other one of the plurality of tangential lines (SS5, SS6). The sixth tangential line (SS5) is located more distant, in the second direction (L4b), from the second particular first line electrode (X1a) than any other one of the plurality of tangential lines (SS5, SS6). All of a plurality of tangential lines extending along the longitudinal axis and being in contact with outer end edges (GT4) of the fourth fixed electrode (252d) when viewed along the normal to the front surface (3a) of the touchscreen panel (3) include a seventh tangential line (SS8) and an eighth tangential line (SS7). The seventh tangential line (SS8) is located more distant, in the first direction (L4a), from the second particular first line electrode (X1a) than any other one of the plurality of tangential lines (SS7, SS8). The eighth tangential line (SS7) is located more distant, in the second direction (L4b), from the seventh tangential line (SS8) than any other one of the plurality of tangential lines (SS7, SS8). The third fixed electrode (252c) includes a third shifted portion (P3) shifted by a distance between the sixth tangential line (SS5) and the eighth tangential line (SS7) with respect to the fourth fixed electrode (252d). The fourth fixed electrode (252d) includes a fourth shifted portion (P4) shifted by a distance between the fifth tangential line (SS6) and the seventh tangential line (SS8) with respect to the third fixed electrode (252c).

According to this configuration, the input device (2) may include a plurality of first fixed electrodes (252a, 252c) and a plurality of second fixed electrodes (252b, 252d) which are separated from each other, thus allowing the operator to perform various operations on the input device (2) to enter a command via the operating member (23).

An input device (2) according to a seventh aspect, which may be implemented in conjunction with any one of the first to fifth aspects, further includes a third fixed electrode (252c) and a fourth fixed electrode (252d), both of which are provided on the principal surface (251b) of the base member (25). All of a plurality of tangential lines extending along the longitudinal axis of the one or more first line electrodes (X1) and being in contact with outer end edges (GT3) of the third fixed electrode (252c) when viewed along the normal to the front surface (3a) of the touchscreen panel (3) include a fifth tangential line (SS5) and a sixth tangential line (SS6). The fifth tangential line (SS5) is located more distant, in the second direction (L4b), from a second particular first line electrode (X1a) out of the one or more first line electrodes (X1a) than any other one of the plurality of tangential lines (SS5, SS6). The sixth tangential line (SS6) is located more distant, in the first direction (L4a), from the second particular first line electrode (X1a) than any other one of the plurality of tangential lines (SS5, SS6). All of a plurality of tangential lines extending along the longitudinal axis and being in contact with outer end edges (GT4) of the fourth fixed electrode (252d) when viewed along the normal to the front surface (3a) of the touchscreen panel (3) include a seventh tangential line (SS7) and an eighth tangential line (SS8). The seventh tangential line (SS7) is located more distant, in the second direction (L4b), from the second particular first line electrode (X1a) than any other one of the plurality of tangential lines (SS7, SS8). The eighth tangential line (SS8) is located more distant, in the first direction (L4a), from the seventh tangential line (SS7) than any other one of the plurality of tangential lines (SS7, SS8). The third fixed electrode (252c) includes a third shifted portion (P3) shifted by a distance (R21) between the sixth tangential line (SS6) and the eighth tangential line (SS8) with respect to the fourth fixed electrode (252d). The fourth fixed electrode (252d) includes a fourth shifted portion (P4) shifted by a distance (R22) between the fifth tangential line (SS5) and the seventh tangential line (SS7) with respect to the third fixed electrode (252c).

An input device (2) according to an eighth aspect, which may be implemented in conjunction with any one of the first to fifth aspects, further includes a third fixed electrode (252c) and a fourth fixed electrode (252d), both of which are provided on the principal surface (251b) of the base member (25). All of a plurality of tangential lines extending along the longitudinal axis of the one or more first line electrodes (X1) and being in contact with outer end edges (GT3) of the third fixed electrode (252c) when viewed along the normal to the front surface (3a) of the touchscreen panel (3) include a fifth tangential line (SS5) and an sixth tangential line (SS6). The fifth tangential line (SS5) is located more distant, in the second direction (L4b), from the particular first line electrode (X1a) than any other one of the plurality of tangential lines (SS5, SS6). The sixth tangential line (SS6) is located more distant, in the first direction (L4a), from the particular first line electrode (X1a) than any other one of the plurality of tangential lines (SS5, SS6). All of a plurality of tangential lines extending along the longitudinal axis and being in contact with outer end edges (GT4) of the fourth fixed electrode (252d) when viewed along the normal to the front surface (3a) of the touchscreen panel (3) include a seventh tangential line (SS7) and an eighth tangential line (SS8). The seventh tangential line (SS7) is located more distant, in the second direction (L4b), from the particular first line electrode (X1a) than any other one of the plurality of tangential lines (SS7, SS8). The eighth tangential line (SS8) is located more distant, in the first direction (L4a), from the seventh tangential line (SS7) than any other one of the plurality of tangential lines (SS7, SS8). The third fixed electrode (252c) includes a third shifted portion (P3) shifted by a distance (R21) between the sixth tangential line (SS6) and the eighth tangential line (SS8) with respect to the fourth fixed electrode (252d). The fourth fixed electrode (252d) includes a fourth shifted portion (P4) shifted by a distance (R22) between the fifth tangential line (SS5) and the seventh tangential line (SS7) with respect to the third fixed electrode (252c).

In an input device (2) according to a ninth aspect, which may be implemented in conjunction with any one of the first to eighth aspects, the moving electrode (242) moves, as the operating member (23) is turned, along a circular orbit (T2). The first fixed electrode (252a) and the second fixed electrode (252b) are arranged adjacent to each other along the circular orbit (T2) when viewed along a rotational axis (L3) of the operating member (23).

This configuration enables effectively switching the first fixed electrode (252a) and the second fixed electrode (252b) from an electrically conductive state into an electrically non-conductive state, or vice versa, by moving the moving electrode (242).

In an input device (2) according to a tenth aspect, which may be implemented in conjunction with any one of the first to ninth aspects, each of the first fixed electrode (252a) and the second fixed electrode (252b) has a pair of lateral sides (71, 72) extending along the longitudinal axis.

This configuration allows the first fixed electrode (252a) and the second fixed electrode (252b) to have such shapes that hardly overlap with each other along the longitudinal axis of the first line electrode (X1).

An input device (2) according to an eleventh aspect, which may be implemented in conjunction with any one of the first to tenth aspects, further includes an elastic sheet (27). The elastic sheet (27) is provided on the other side of the base member (25). The other side is opposite from one side, where the operating member (23) is provided, of the base member (25).

According to this configuration, when the input device (2) is placed on the front surface (3a) of the touchscreen panel (3), the elastic sheet (27) is interposed between the base member (25) and the front surface (3a) of the touchscreen panel (3). This may reduce the chances of the base member (25) being turned by the rotational torque of the operating member (23).

In an input device (2) according to a twelfth aspect, which may be implemented in conjunction with any one of the first to eleventh aspects, an outer peripheral surface of the base member (25) is provided with an externally recognizable marker (255).

This configuration allows, when the input device (2) is placed on the front surface (3a) of the touchscreen panel (3), the operator to externally recognize, by the marker (255), the positions where the first fixed electrode (252a) and the second fixed electrode (252b) are arranged on the base member (25).

In an input device (2) according to a thirteenth aspect, which may be implemented in conjunction with any one of the first to twelfth aspects, the one or more first line electrodes (X1a) include a plurality of first line electrodes (X1a) which are arranged parallel to each other.

According to this configuration, placing the input device (2) on the front surface (3a) of the touchscreen panel (3) such that the first fixed electrode (252a) of the input device (2) has a portion overlapping with the at least one first line electrode (X1a) out of the plurality of first line electrodes (X1) of the touchscreen panel (3) allows the touchscreen panel (3) to detect an operation performed on the input device (2).

In an input device (2) according to a fourteenth aspect, which may be implemented in conjunction with the thirteenth aspect, all of the plurality of first line electrodes (X1), but one first line electrode (X1), receive a scan voltage applied sequentially thereto. The one first line electrode (X1) that does not receive the scan voltage is connected to a reference potential.

This configuration is applicable to a touchscreen panel (3) for controlling application of voltage to the plurality of first line electrodes (X1) such that all of the plurality of first line electrodes (X1), but one first line electrode (X1), receive a scan voltage applied sequentially thereto and the one first line electrode (X1) that does not receive the scan voltage is connected to a reference potential.

In an input device (2) according to a fifteenth aspect, which may be implemented in conjunction with the thirteenth aspect, the first fixed electrode (252a) and the second fixed electrode (252b) are arranged to avoid overlapping with the same one of the plurality of first line electrodes (X1) when viewed along the normal to the front surface (3a) of the touchscreen panel (3).

This configuration allows the touchscreen panel (3) to accurately detect an operation performed on the operating member (23) of the input device (2).

In an input device (2) according to a sixteenth aspect, which may be implemented in conjunction with any one of the thirteenth to fifteenth aspects, respective centers of the plurality of first line electrodes (X1) are arranged at a predetermined pitch, and the first predetermined distance (R11) and the second predetermined distance (R12) are equal to or greater than the predetermined pitch.

This configuration allows the respective shifted portions (P1, P2) of the first fixed electrode (252a) and the second fixed electrode (252b) to overlap with mutually different ones of the plurality of first line electrodes (X1). This allows the touchscreen panel (3) to accurately detect a rotary operation performed on the input device (2).

In an input device (2) according to a seventeenth aspect, which may be implemented in conjunction with any one of the first to sixteenth aspects, the second line electrode (Y1) is extended perpendicularly to the longitudinal axis.

An input system (1) according to an eighteenth aspect includes the input device (2) according to the fourteenth aspect and the touchscreen panel (3).

This configuration provides an input system (1) that achieves the above-described advantages of the input device (2).

REFERENCE SIGNS LIST

1 Input System
2 Input Device

3 Touchscreen Panel
3a Front Surface
23 Rotary Click Cam (Operating Member)
25 Contact Substrate (Base Member)
27 Elastic Sheet
71, 72 Opposing Sides (Lateral Sides)
242 Moving Electrode
251b Lower Surface
252a, 252c Fixed Electrode (First Fixed Electrode)
252b, 252d Fixed Electrode (Second Fixed Electrode)
255 Marker
L2 Orthogonal Direction
L3 Rotary Axis
L4 Particular Direction
L4a Direction (First Direction)
L4b Opposite Direction (Second Direction)
P1, P1a Shifted Portion (First Shifted Portion)
P2, P2a Shifted Portion (Second Shifted Portion)
R11, R21 Predetermined Distance (First Predetermined Distance)
R12, R22 Predetermined Distance (Second Predetermined Distance)
SS1 Tangential Line (First Tangential Line)
SS2 Tangential Line (Second Tangential Line)
SS3 Tangential Line (Third Tangential Line)
SS4 Tangential Line (Fourth Tangential Line)
SS5 Tangential Line (fifth Tangential Line, sixth Tangential Line)
SS6 Tangential Line (sixth Tangential Line, fifth Tangential Line)
SS7 Tangential Line (seventh Tangential Line, eighth Tangential Line)
SS8 Tangential Line (eighth Tangential Line, seventh Tangential Line)
T2 Circular Orbit
X1a First Line Electrode
Y1 Second Line Electrode

The invention claimed is:

1. An input device comprising:
a base member placed on a front surface of a touchscreen panel;
an operating member provided to be rotatable around a rotational axis with respect to the base member; and
a first fixed electrode and a second fixed electrode arranged on a principal surface of the base member, and configured to remain fixed in all directions relative to the touchscreen panel when the operating member is rotated,
the first fixed electrode and the second fixed electrode being configured to, as the operating member is operated, be switched from an electrically conductive state into an electrically non-conductive state, or vice versa,
the touchscreen panel including:
one or more first line electrodes extending along a longitudinal axis thereof and having a portion overlapping with the first fixed electrode when viewed along a normal to the front surface of the touchscreen panel; and
a plurality of second line electrodes intersecting with the one or more first line electrodes when viewed along the normal to the front surface of the touchscreen panel,
all of a plurality of tangential lines extending along the longitudinal axis of the one or more first line electrodes and being in contact with outer end edges of the first fixed electrode when viewed along the normal to the front surface of the touchscreen panel including a first tangential line and a second tangential line, the first tangential line being located more distant, in a first direction intersecting with the longitudinal axis of the one or more first line electrodes, from a particular first line electrode out of the one or more first line electrodes than any other one of the plurality of tangential lines in contact with the outer end edges of the first fixed electrode, the second tangential line being located more distant, in a second direction opposite from the first direction, from the particular first line electrode than any other one of the plurality of tangential lines in contact with the outer end edges of the first fixed electrode,
all of a plurality of tangential lines extending along the longitudinal axis of the one or more first line electrodes and being in contact with outer end edges of the second fixed electrode when viewed along the normal to the front surface of the touchscreen panel including a third tangential line and a fourth tangential line, the third tangential line being located more distant, in the first direction, from the particular first line electrode than any other one of the plurality of tangential lines in contact with the outer end edges of the second fixed electrode, the fourth tangential line being located more distant, in the second direction, from the third tangential line than any other one of the plurality of tangential lines in contact with the outer end edges of the second fixed electrode,
the first fixed electrode including a first shifted portion shifted by a first predetermined distance between the second tangential line and the fourth tangential line with respect to the second fixed electrode, and
the second fixed electrode including a second shifted portion shifted by a second predetermined distance between the first tangential line and the third tangential line with respect to the first fixed electrode.

2. The input device of claim 1, further comprising a moving electrode provided for the operating member,
the moving electrode being configured to switch, as the operating member is turned, the first fixed electrode and the second fixed electrode from the electrically conductive state into the electrically non-conductive state, or vice versa.

3. The input device of claim 1, wherein
the operating member is configured to be brought closer toward, or away from, the base member, and
the first fixed electrode and the second fixed electrode are made electrically conductive or non-conductive with each other as the operating member is brought closer toward, or away from, the base member.

4. The input device of claim 1, wherein
the first shifted portion of the first fixed electrode has an area at least one-third as large as an area of the first fixed electrode, and
the second shifted portion of the second fixed electrode has an area at least one-third as large as an area of the second fixed electrode.

5. The input device of claim 1, wherein
the first shifted portion of the first fixed electrode has a same area as the first fixed electrode, and
the second shifted portion of the second fixed electrode has a same area as the second fixed electrode.

6. The input device of claim 1, wherein
a moving electrode is configured to move, as the operating member is turned, along a circular orbit, and the first fixed electrode and the second fixed electrode are arranged adjacent to each other along the circular orbit when viewed along a rotational axis of the operating member.

7. The input device of claim 1, wherein
each of the first fixed electrode and the second fixed electrode has a pair of lateral sides extending along the longitudinal axis.

8. The input device of claim 1, further comprising an elastic sheet,
the elastic sheet being provided on an other side of the base member, the other side being opposite from one side, where the operating member is provided, of the base member.

9. The input device of claim 1, wherein
an outer peripheral surface of the base member is provided with an externally recognizable marker.

10. The input device of claim 1, wherein
the first fixed electrode and the second fixed electrode are arranged to avoid overlapping with a same one of the one or more first line electrodes when viewed along the normal to the front surface of the touchscreen panel.

11. The input device of claim 1, wherein
respective centers of the one or more first line electrodes are arranged at a predetermined pitch, and
the first predetermined distance and the second predetermined distance are equal to or greater than the predetermined pitch.

12. The input device of claim 1, wherein
the plurality of second line electrodes is extended perpendicularly to the longitudinal axis.

13. An input system comprising:
the input device of claim 1; and
the touchscreen panel.

14. The input device of claim 1, further comprising a third fixed electrode and a fourth fixed electrode, both of which are provided on the principal surface of the base member,
all of a plurality of tangential lines extending along the longitudinal axis and being in contact with outer end edges of the third fixed electrode when viewed along the normal to the front surface of the touchscreen panel including a fifth tangential line and a sixth tangential line, the fifth tangential line being located more distant, in the first direction, from a second particular first line electrode out of the one or more first line electrodes than any other one of the plurality of tangential lines in contact with the outer end edges of the third fixed electrode, the sixth tangential line being located more distant, in the second direction, from the second particular first line electrode than any other one of the plurality of tangential lines in contact with the outer end edges of the third fixed electrode,
all of a plurality of tangential lines extending along the longitudinal axis and being in contact with outer end edges of the fourth fixed electrode when viewed along the normal to the front surface of the touchscreen panel including a seventh tangential line and an eighth tangential line, the seventh tangential line being located more distant, in the first direction, from the second particular first line electrode than any other one of the plurality of tangential lines in contact with the outer end edges of the fourth fixed electrode, the eighth tangential line being located more distant, in the second direction, from the seventh tangential line than any other one of the plurality of tangential lines in contact with the outer end edges of the fourth fixed electrode,
the third fixed electrode including a third shifted portion shifted by a distance between the sixth tangential line and the eighth tangential line with respect to the fourth fixed electrode,
the fourth fixed electrode including a fourth shifted portion shifted by a distance between the fifth tangential line and the seventh tangential line with respect to the third fixed electrode.

15. The input device of claim 1, further comprising a third fixed electrode and a fourth fixed electrode, both of which are provided on the principal surface of the base member,
all of a plurality of tangential lines extending along the longitudinal axis and being in contact with outer end edges of the third fixed electrode when viewed along the normal to the front surface of the touchscreen panel including a fifth tangential line and a sixth tangential line, the fifth tangential line being located more distant, in the second direction, from a second particular first line electrode out of the one or more first line electrodes than any other one of the plurality of tangential lines in contact with the outer end edges of the third fixed electrode, the sixth tangential line being located more distant, in the first direction, from the second particular first line electrode than any other one of the plurality of tangential lines in contact with the outer end edges of the third fixed electrode,
all of a plurality of tangential lines extending along the longitudinal axis and being in contact with outer end edges of the fourth fixed electrode when viewed along the normal to the front surface of the touchscreen panel including a seventh tangential line and an eighth tangential line, the seventh tangential line being located more distant, in the second direction, from the second particular first line electrode than any other one of the plurality of tangential lines in contact with the outer end edges of the fourth fixed electrode, the eighth tangential line being located more distant, in the first direction, from the seventh tangential line than any other one of the plurality of tangential lines in contact with the outer end edges of the fourth fixed electrode,
the third fixed electrode including a third shifted portion shifted by a distance between the sixth tangential line and the eighth tangential line with respect to the fourth fixed electrode,
the fourth fixed electrode including a fourth shifted portion shifted by a distance between the fifth tangential line and the seventh tangential line with respect to the third fixed electrode.

16. The input device of claim 1, further comprising a third fixed electrode and a fourth fixed electrode, both of which are provided on the principal surface of the base member,
all of a plurality of tangential lines extending along the longitudinal axis and being in contact with outer end edges of the third fixed electrode when viewed along the normal to the front surface of the touchscreen panel including a fifth tangential line and a sixth tangential line, the fifth tangential line being located more distant, in the second direction, from the particular first line electrode than any other one of the plurality of tangential lines in contact with the outer end edges of the third fixed electrode, the sixth tangential line being located more distant, in the first direction, from the particular first line electrode than any other one of the plurality of tangential lines in contact with the outer end edges of the third fixed electrode,
all of a plurality of tangential lines extending along the longitudinal axis and being in contact with outer end edges of the fourth fixed electrode when viewed along the normal to the front surface of the touchscreen panel including a seventh tangential line and an eighth tangential line, the seventh tangential line being located more distant, in the second direction, from the particular first line electrode than any other one of the plurality of tangential lines in contact with the outer end edges of the fourth fixed electrode, the eighth tangential line being located more distant, in the first direction, from the seventh tangential line than any other one of the plurality of tangential lines in contact with the outer end edges of the fourth fixed electrode, the third fixed electrode including a third shifted portion shifted by a distance between the sixth tangential line and the eighth tangential line with respect to the fourth fixed electrode, the fourth fixed electrode including a fourth shifted portion shifted by a distance between the fifth tangential line and the seventh tangential line with respect to the third fixed electrode.

17. The input device of claim 1, wherein the first fixed electrode and the second fixed electrode are fixed in position relative to the touchscreen panel regardless of a rotation of the operating member with respect to the base member.

* * * * *